(12) United States Patent
Balachandran et al.

(10) Patent No.: US 9,836,230 B2
(45) Date of Patent: Dec. 5, 2017

(54) DATA BACKUP WITH ROLLING BASELINES

(71) Applicant: NetApp, Inc., Sunnyvale, CA (US)

(72) Inventors: Ajith Balachandran, Bangalore (IN); James Namboorikandathil Joseph, Bangalore (IN); Michael R Eisler, Colorado Springs, CO (US); Rahul Pradeep, Bangalore (IN); Somesh Kumar, Bangalore (IN); Vijay Srinath, Bangalore (IN); Yuedong Mu, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 335 days.

(21) Appl. No.: 14/688,418

(22) Filed: Apr. 16, 2015

(65) Prior Publication Data

US 2016/0306573 A1  Oct. 20, 2016

(51) Int. Cl.
*G06F 12/00* (2006.01)
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0644* (2013.01); *G06F 3/0683* (2013.01); *G06F 11/1446* (2013.01); *G06F 11/1451* (2013.01); *G06F 11/1458* (2013.01)

(58) Field of Classification Search
None
See application file for complete search history.

(56) References Cited

U.S. PATENT DOCUMENTS

| 5,765,173 A | 6/1998 | Cane et al. |
| 8,554,736 B2 | 10/2013 | Radon et al. |
| 2011/0314239 A1* | 12/2011 | Kono .................. G06F 11/2097 711/162 |

OTHER PUBLICATIONS

Soundararajan, et al., "The Impact of Management Operations on the Virtualized Datacenter", ISCA'10 Jun. 19-23, 2010, Saint-Malo, France, Jun. 19-23, 2010, 326-337.

* cited by examiner

*Primary Examiner* — Midys Rojas
(74) *Attorney, Agent, or Firm* — Gilliam IP PLLC

(57) ABSTRACT

First partial baseline data of a first storage system is identified. First changed data of the first storage system is identified. The first changed data comprises data that has changed since a previous point in time. First backup data is written to a second storage system. The first backup data comprises the first partial baseline data and the first changed data. After writing the first backup data to the second storage system, second partial baseline data of the first storage system is identified. The second partial baseline data does not include the first partial baseline data. Second changed data of the first storage system is identified. The second changed data comprises data that has changed since writing the first backup data. Second backup data is written to the second storage system. The second backup data comprises the second partial baseline data and the second changed data.

20 Claims, 18 Drawing Sheets

DATA BACKUP WITH ROLLING BASELINES

BACKGROUND

Aspects of the disclosures generally relate to the field of data storage, and, more particularly, to data backup with rolling baselines.

Data backup is widely used to recover data in the event of data loss, data corruption, etc., particularly in enterprise storage systems. While data backup can be as straightforward as copying data from a primary storage system to a secondary storage system, many techniques are used to optimize the process. For example, only data that has changed since the previous backup might be backed up, thus reducing the overall amount of data that is backed up.

BRIEF DESCRIPTION OF THE DRAWINGS

The disclosures herein may be better understood by referencing the accompanying drawings.

DESCRIPTION OF EXAMPLE ILLUSTRATION(S)

Figure 1:
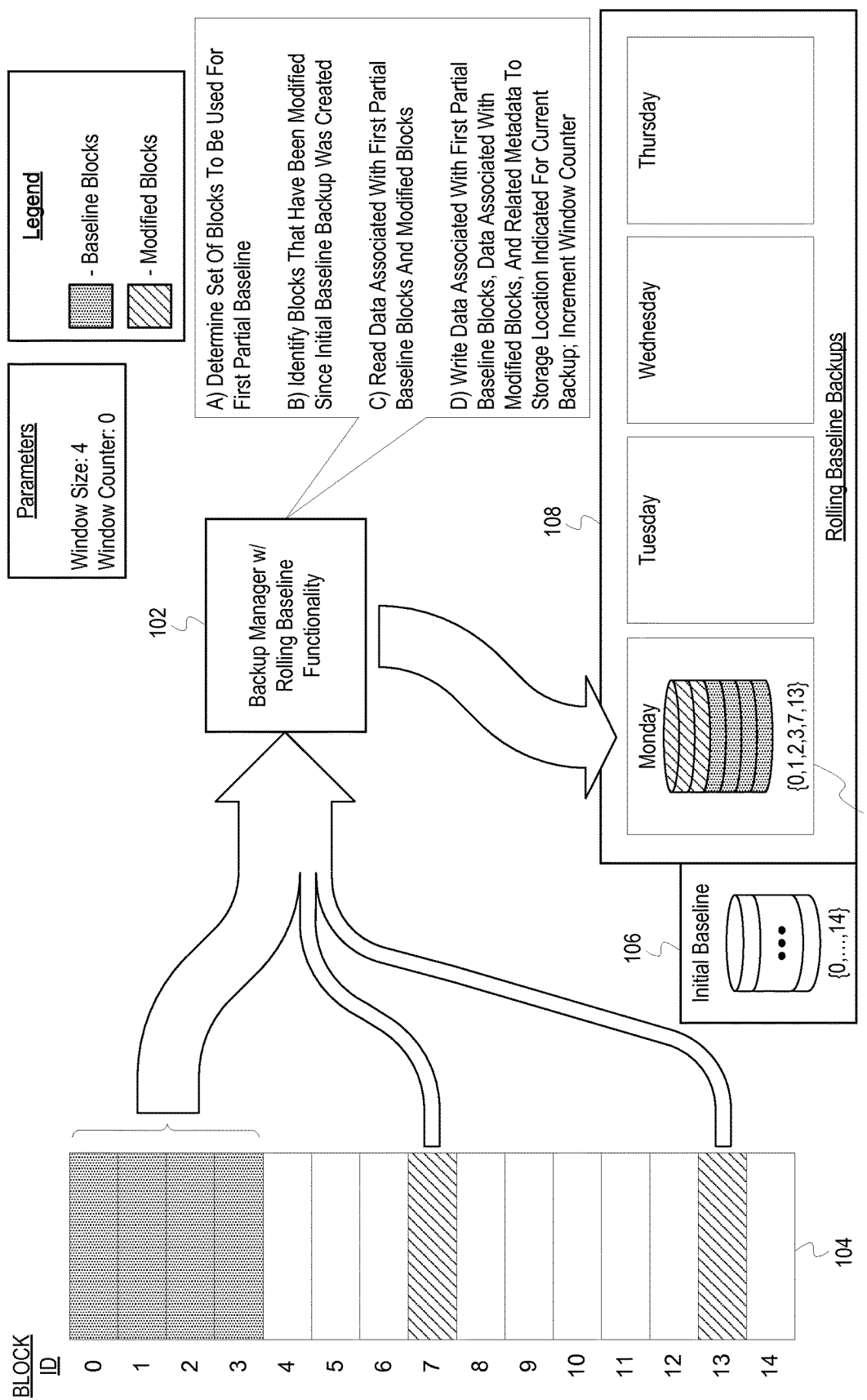
FIG. 1 depicts example operations for generating a first backup by a backup manager.

The description that follows includes example systems, methods, techniques, instruction sequences and computer program products that embody techniques of the disclosures herein. However, it is understood that the described features may be practiced without these specific details. For instance, although examples refer to data blocks, the disclosures herein can apply to other data unit types, such as inodes, volumes, partitions, databases, etc. In other instances, well-known instruction instances, protocols, structures and techniques have not been shown in detail in order not to obfuscate the description.

Terminology

The disclosures herein can apply to a variety of "data units." A data unit, as used herein, is an individually identifiable collection of data. For example, a particular storage device might read and write data in the form of "blocks", which, as an example, might be four kilobytes in size. A block is an example of a data unit. Other examples of data units include inodes, files, volumes, etc. Further, many data units are comprised of smaller data units. For example, a volume might be defined as a particular set of blocks or an inode might reference blocks.

A data unit, as used herein, is assumed to have a unique identifier. For example, a block might be identified by a block number, an inode might be identified by an inode number, and a file might be identified by a file path. In some instances, the unique identifier might be comprised of multiple identifiers. For example, two different volumes might include blocks identified by block number '10'. Each of the blocks, however, might be uniquely identified by a combination of the volume identifier and the block identifier. When used hereinafter, the term "identifier" refers to a unique identifier unless a non-unique identifier is sufficient, in which case the identifier can be unique or non-unique. Additionally, while the examples below will focus on specific types of data units, such as blocks or inodes, the disclosures are not limited to the specific type of data unit described, but can also apply to other data units.

The examples used herein assume a zero-based numbering system. E.g., arrays are zero indexed, the least significant bit of a binary value is the $0^{th}$ position, etc. The examples, however, can be adapted to a one-based numbering system or other numbering system.

The term "storage system", as used herein, can apply to any type of storage device or collection of storage devices. For example, a storage system can be a single hard disk, an array of storage devices, a clustered storage system, etc. Similarly, a storage device can be a hard disk, flash drive, tape drive/tape media, etc.

Backups Generally

Various techniques are used to backup data. Consider, for example, incremental backups. An initial baseline backup of a storage system is generated. The baseline includes all data of the storage system that is to be backed up. For example, the storage system might comprise multiple volumes. The storage system can be configured to back up one or more of the volumes. The baseline would thus include the data of each volume that the storage system is configured to back up.

Once the initial baseline backup is generated, incremental backups are periodically generated. An incremental backup comprises data that has changes since the previous backup was generated. Thus, instead of backing up all the data, only the changed subset is backed up, thus reducing the size of the backups (typically). To restore data from an incremental backup, the data of the initial baseline is written to the storage system. Once the initial baseline is written to the storage system, each of the incremental backups is written to the storage system in chronological order.

With incremental backups (and other backup paradigms), periodic baselines are created. Consider, for example, a scenario in which only incremental backups are taken and each backup is stored on an individual magnetic tape medium (hereinafter "tape"). To restore the data, the initial baseline must be restored, and then each individual backup restored. Restoring data from hundreds of tapes can be a time-consuming and labor-intensive process. Thus, a backup system might generate a single baseline a week (e.g., on Sunday), and generate incremental backups every other day. Thus, to restore data from the backups, a maximum of seven tapes are used.

Example Illustrations of Rolling Baseline Backups

Instead of periodically generating a full baseline backup, a backup manager can generate a rolling baseline that is spread across multiple backups. To generate a rolling baseline, the backup manager generates a partial baseline each time it performs a backup. The backup manager stores the partial baseline as a partial baseline backup along with any modified data (i.e., the backup manager also generates an incremental backup). The size of the partial baseline is determined according to a "window size" parameter. The window size indicates the number of backups over which the rolling baseline is spread across. For example, if the window size is four, each backup will include a partial baseline that is one-quarter of the size of the total baseline (with some variation if the data is not evenly divisible by four). Each of the partial baselines comprises a unique fourth of the baseline data. Thus, the partial baselines for any four consecutive backups can be combined to create a complete baseline.

FIGS. 1 through 4 depict example operations of a backup manager with rolling baseline functionality (hereinafter "backup manager"). FIGS. 1 through 4 depict an example scenario in which each of the figures depicts an individual backup procedure. The example scenario assumes a window size of four. Thus, when combined, the individual backups depicted in FIGS. 1 through 4 result in a complete baseline. For ease of explanation, the example scenario assumes that the individual backups are performed on a daily basis (e.g., a first backup on Monday, a second backup on Tuesday, etc.). The particular backup scheme used can vary, however, and some of the possible variations are discussed below.

FIG. 1 depicts example operations for generating a first backup by a backup manager. FIG. 1 depicts a backup manager 102 and a set of data blocks (hereinafter "blocks") 104. FIG. 1 also depicts an initial baseline backup 106 and a set of rolling baseline backups 108. When the operations of the backup manager 102 depicted in FIG. 1 are complete, a first rolling baseline backup 110 is generated.

The backup manager 102 maintains at least two parameters, the window size and a window counter, which the backup manager 102 uses to determine which blocks are included in each partial baseline. The window size is, typically, a constant value (but can be configurable) and the window counter is incremented after each individual backup is generated. As stated above, the window size is four. For FIG. 1, the window counter is initialized to zero.

The initial baseline backup 106 is optional and primarily serves as insurance against data loss that occurs prior to the completion of a sufficient number of rolling baseline backups. For instance, if the initial baseline backup 106 was not generated and data loss occurs after three rolling baseline backups are completed, only three-quarters of a complete baseline exists. Thus, some data may not be recoverable. If an initial baseline backup 106 is generated, the initial baseline backup 106 becomes largely irrelevant after a sufficient number of rolling baseline backups are generated. The number of rolling baseline backups that are sufficient will generally be equal to the window size. In some instances, the initial baseline backup 106 may be relevant after a sufficient number of rolling baseline backups are generated. For example, if data associated with a backup is corrupted, the initial baseline backup 106 might include the uncorrupted data. The example operations in FIG. 1 assume that the initial baseline backup 106 has already been generated by the backup manager 102.

At stage A, the backup manager 102 determines a set of the blocks 104 to be used for the first partial baseline. Based on a window size of four, the backup manager 102 determines that four blocks should be included in the partial baseline. The backup manager 102 backs up data on a per block basis. Thus, although one-quarter of fifteen blocks is 3.75 blocks, the backup manager 102 rounds the number of blocks up to four.

Once the backup manager 102 determines the number of blocks to include in the partial baseline, the backup manager 102 determines which four of the blocks 104 should be included in the partial baseline. The backup manager 102 can determine which four blocks should be included in the partial baseline using a variety of techniques. In this example, the backup manager 102 divides the blocks 104 into sequential quarters. Thus, the first quarter includes blocks 0 through 3, the second quarter includes blocks 4 through 7, the third quarter includes blocks 8 through 11, and the fourth "quarter" includes blocks 12 through 14. The backup manager 102 uses the window counter to determine which quarter of the blocks 104 to include in the partial baseline, with a window counter value of 0 corresponding to the first quarter (blocks 0 through 3), a window counter value of 1 corresponding to the second quarter (blocks 4 through 7), etc. In this instance, because the window counter is 0, the backup manager 102 determines that blocks 0 through 3 should be included in the partial baseline.

At stage B, the backup manager 102 identifies blocks that have been modified since the initial baseline backup 106 was generated. The technique(s) used to identify which of the blocks 104 have been modified can vary. For example, the backup manager 102 or another component can maintain a list (or other data structure) that identifies blocks that have been modified, clearing the list each time an incremental backup is generated. As another example, the backup manager 102 or another component might maintain a table (or other data structure) identifying all of the blocks 104. The table can indicate whether a particular block has been modified (i.e., can include a dirty bit). In this instance, blocks 7 and 13 have been modified since the initial baseline backup 106 was generated.

At stage C, the backup manager 102 reads the data associated with the first set of blocks determined as stage A and the modified blocks determined at stage B. In this instance, the backup manager 102 reads the data from blocks 0 through 3, 7, and 13.

At stage D, the backup manager 102 writes the data read at stage C to a storage location(s) indicated for the current backup and increments the window counter value. The particular storage location(s) that the backup manager 102 writes the data to can vary. In some instances, the backup manager 102 always writes the data to the same storage location(s). For example, a storage system that includes the backup manager 102 may be coupled with a single tape drive. After the backup manager 102 writes the data to a storage medium located in the tape drive, an administrator may remove the storage medium and insert a different storage medium.

In some instances, the backup manager 102 can write the data to rotating storage locations. For example, a storage system that includes the backup manager 102 may be coupled with multiple tape drives. The backup manager 102 can select a particular tape drive to write the data to based, at least in part, on the window size and window counter. For example, the backup manager 102 may utilize modular arithmetic to select a particular tape drive. For example, the backup manager 102 can compute the value of the window counter modulo the window size. Thus, if the window counter is 0 and the window size is 4, the backup manager 102 selects a tape drive identified by the identifier 0; if the window counter is 1 and the window size is 4, the backup manager selects a tape drive identified by the identifier 1, etc.

In some instances, the particular storage location(s) that the backup manager 102 writes the data to can be explicitly specified for each of the individual backups. In other words, the backup manager 102 may access a data structure that identifies the particular storage locations based on the window counter, date, etc.

In this example, the backup manager 102 writes the blocks to a first storage location associated with the first rolling baseline backup 110. The particular blocks written to the first storage location include the blocks associated with the first partial baseline (blocks 0, 1, 2, and 3) and the blocks modified since the initial baseline backup 106 (blocks 7 and 13). The blocks written to the first storage location are identified in FIG. 1 in braces. Similarly, the blocks associated with the first partial baseline are identified by the dotted pattern and the modified blocks are identified by the striped pattern, as above.

Although not depicted, the backup manager 102 also writes metadata associated with the first rolling baseline backup 110 to the appropriate storage location. The particular metadata written can vary depending on the format of the data being backed up. For example, the metadata might specify the format of the data, whether the data is compressed, the particular compression algorithm used, etc. In this example, the metadata includes the window size and the window counter. The backup manager 102 can use the metadata to facilitate restoration of the data.

As mentioned above, the backup manager 102 also increments the window counter. As described above, the window counter allows the backup manager 102 to determine which blocks are used for the partial baseline. Thus, incrementing the window counter allows the backup manager 102 to identify the blocks used for the next partial baseline. In this example, the window counter is incremented from 0 to 1. The particular amount by which the backup manager 102 increments the window counter can vary between backup managers. Similarly, the backup manager 102 might implement other functionality to identify the blocks to use for the particular partial baseline. In such instances, the backup manager 102 can perform operations appropriate to the particular mechanism used.

Figure 2:
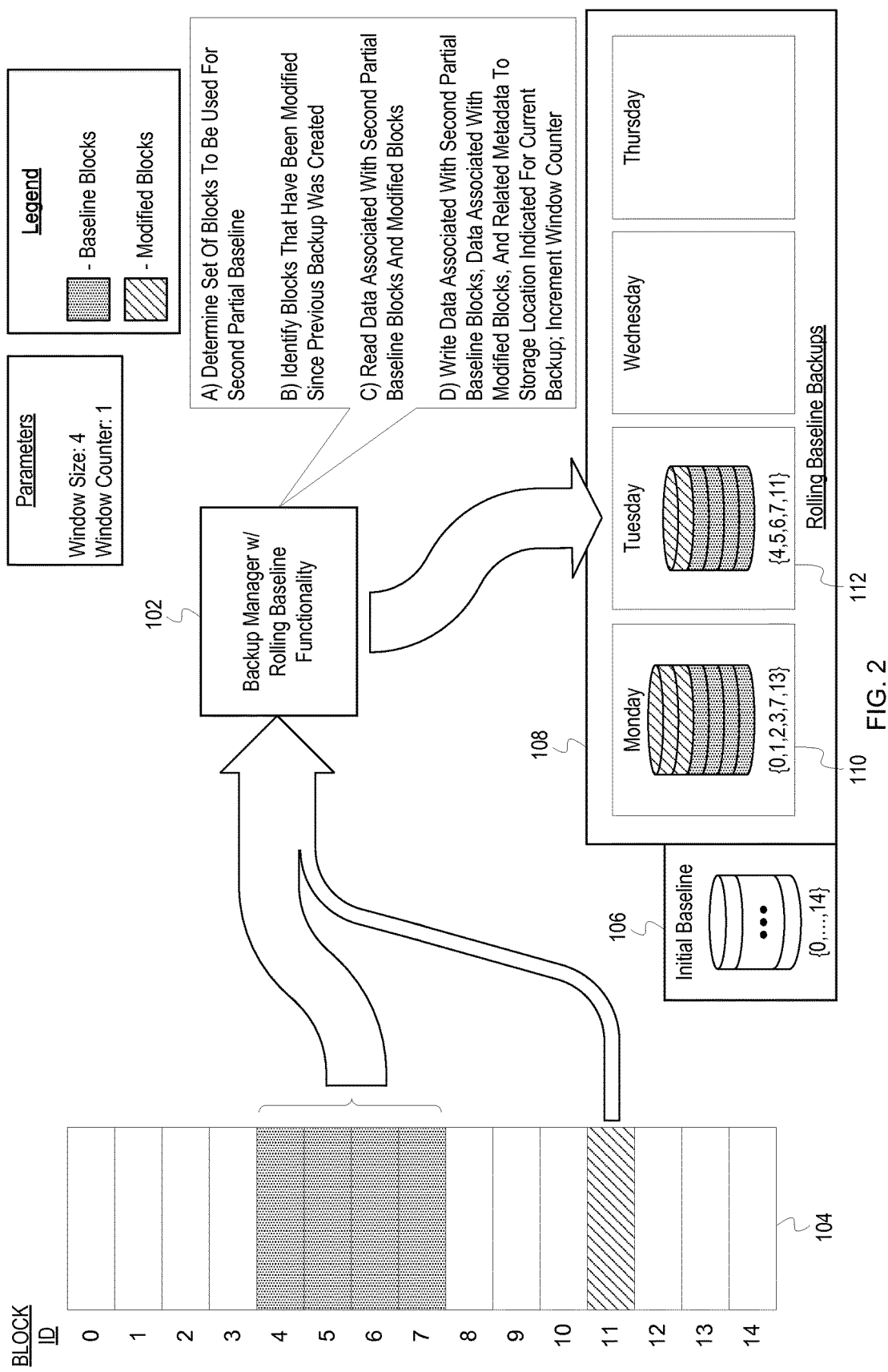
FIG. 2 depicts example operations for generating a second backup by a backup manager.

FIG. 2 depicts example operations for generating a second backup by a backup manager. Similar to FIG. 1, FIG. 2 depicts the backup manager 102 and blocks 104. FIG. 2 also depicts the initial baseline backup 106 and the set of rolling baseline backups 108. When the operations of the backup manager 102 depicted in FIG. 2 are complete, a second rolling baseline backup 112 is generated.

At stage A, the backup manager 102 determines a set of the blocks 104 to be used for the second partial baseline. To determine the set of the blocks 104 to be used for the second partial baseline, the backup manager 102 performs operations similar to those described for stage A of FIG. 1. Because the window size has remained 4, the backup manager 102 determines that four blocks should be used for the second partial baseline, as above. In this instance, however, the window counter is now 1, which corresponds to the second quarter of blocks 104 (blocks 4 through 7). Thus, the backup manager 102 determines that blocks 4 through 7 should be included in the second partial baseline.

At stage B, the backup manager 102 identifies blocks that have been modified since the first rolling baseline backup 110 was generated. The backup manager 102 can identify the blocks that have been modified by performing operations similar to those described for stage B of FIG. 1. In this instance, the backup manager determines that block 11 has been modified since the first rolling baseline backup 110 was generated.

At stage C, the backup manager 102 reads the data associated with the set of blocks determined at stage A and the modified blocks determined at stage B. In this instance, the backup manager 102 reads the data from blocks 4 through 7 and 11.

At stage D, the backup manager 102 writes the data read at stage C to a storage location(s) indicated for the current backup and increments the window counter value. In this example, the second rolling baseline backup 112 is written to the appropriate storage location (associated with the backup for Tuesday). In particular, the backup manager 102 writes blocks 4 through 7 and block 11 to the storage location indicated for the second rolling baseline backup 112.

Additionally, the backup manager 102 writes any metadata (not depicted) associated with the second rolling baseline backup 112, as above. For example, the backup manager 102 writes metadata indicating the window size of 4 and the window counter of 1. Further, as above, the backup manager 102 increments the window counter by one. Thus, in this example, the backup manager 102 increments the window counter from 1 to 2.

Although generally similar to the example depicted in FIG. 1, the example depicted in FIG. 2 illustrates the selection of different blocks for the second partial baseline. The example depicted in FIG. 2 also illustrates the variable-sized nature of the individual rolling baseline backups. While the second partial baseline remains the same size as the first partial baseline, the second rolling baseline backup 112 is smaller than the first rolling baseline backup 110. This results from the smaller number of blocks modified between the first rolling baseline backup 110 and the second rolling baseline backup 112.

Figure 3:
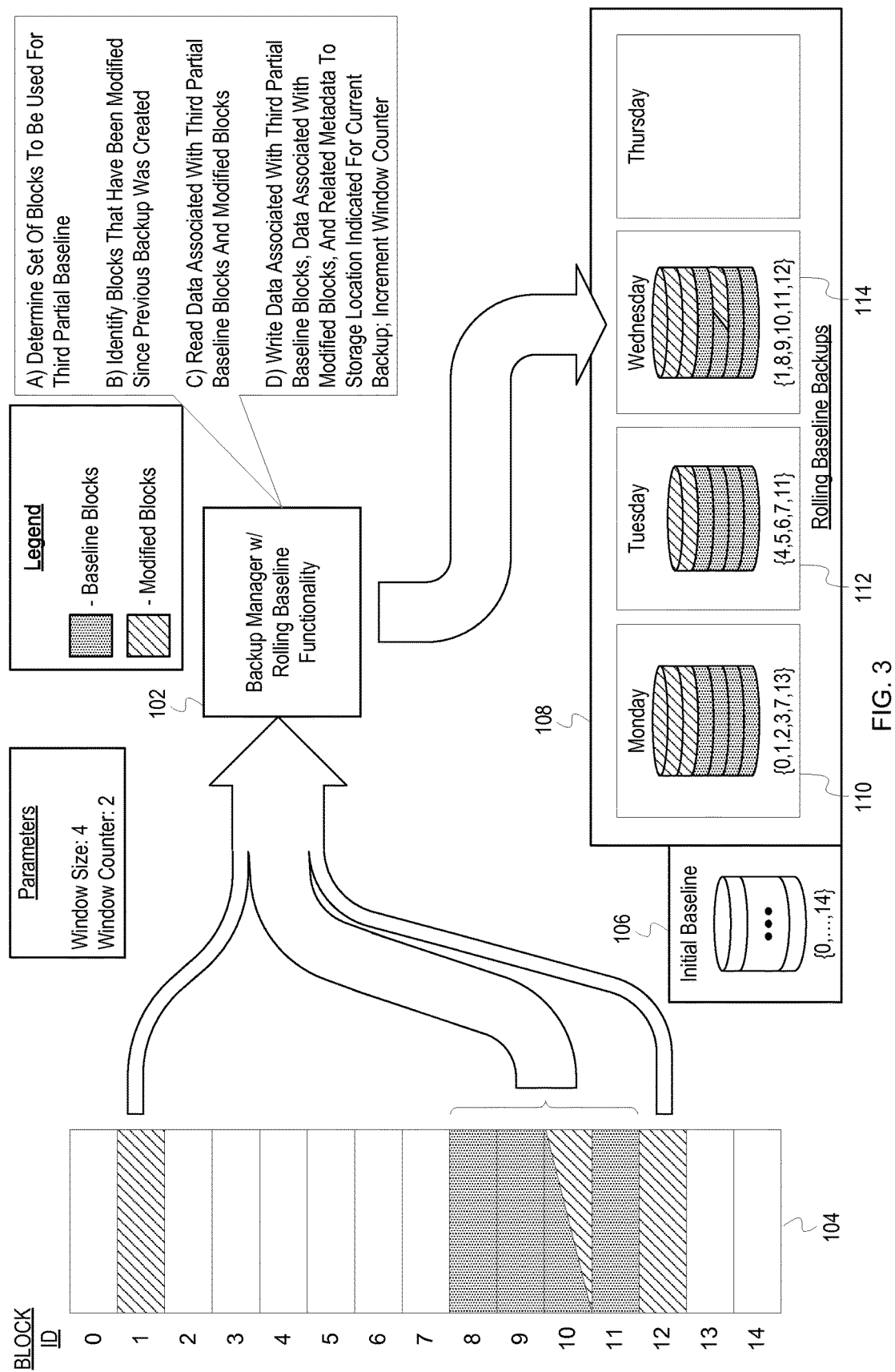
FIG. 3 depicts example operations for generating a third backup by a backup manager.

FIG. 3 depicts example operations for generating a third backup by a backup manager. Similar to FIGS. 1 and 2, FIG. 3 depicts the backup manager 102 and blocks 104. FIG. 3 also depicts the initial baseline backup 106 and the set of rolling baseline backups 108. When the operations of the backup manager 102 depicted in FIG. 3 are complete, a third rolling baseline backup 114 is generated.

At stage A, the backup manager 102 determines a set of the blocks 104 to be used for the third partial baseline. To determine the set of the blocks 104 to be used for the third partial baseline, the backup manager 102 performs operations similar to those described for stage A of FIGS. 1 and 2. Because the window size has remained 4, the backup manager 102 determines that four blocks should be used for the third partial baseline, as above. In this instance, however, the window counter is now 2, which corresponds to the third quarter of blocks 104 (blocks 8 through 11). Thus, the backup manager 102 determines that blocks 8 through 11 should be included in the third partial baseline.

At stage B, the backup manager 102 identifies blocks that have been modified since the second rolling baseline backup 112 was generated. The backup manager 102 can identify the blocks that have been modified by performing operations similar to those described for stage B of FIGS. 1 and 2. In this instance, the backup manager determines that blocks 10 and 12 have been modified since the second rolling baseline backup 112 was generated.

At stage C, the backup manager 102 reads the data associated with the set of blocks determined at stage A and the modified blocks determined at stage B. In this instance, the backup manager 102 reads the data from blocks 8 through 12. Although block 10 was modified since the second rolling baseline backup 112 was generated, block 10 is also part of the third partial baseline. The backup manager 102 only reads block 10 once.

At stage D, the backup manager 102 writes the data read at stage C to a storage location(s) indicated for the current backup and increments the window counter value. In this example, the third rolling baseline backup 114 is written to the appropriate storage location (associated with the backup for Wednesday). The backup manager 102 similarly writes any associated metadata (not depicted). For example, the backup manager 102 writes metadata indicating the window size of 4 and the window counter of 2. Further, as above, the backup manager 102 increments the window counter by one. Thus, in this example, the backup manager 102 increments the window counter from 2 to 3.

Figure 4:
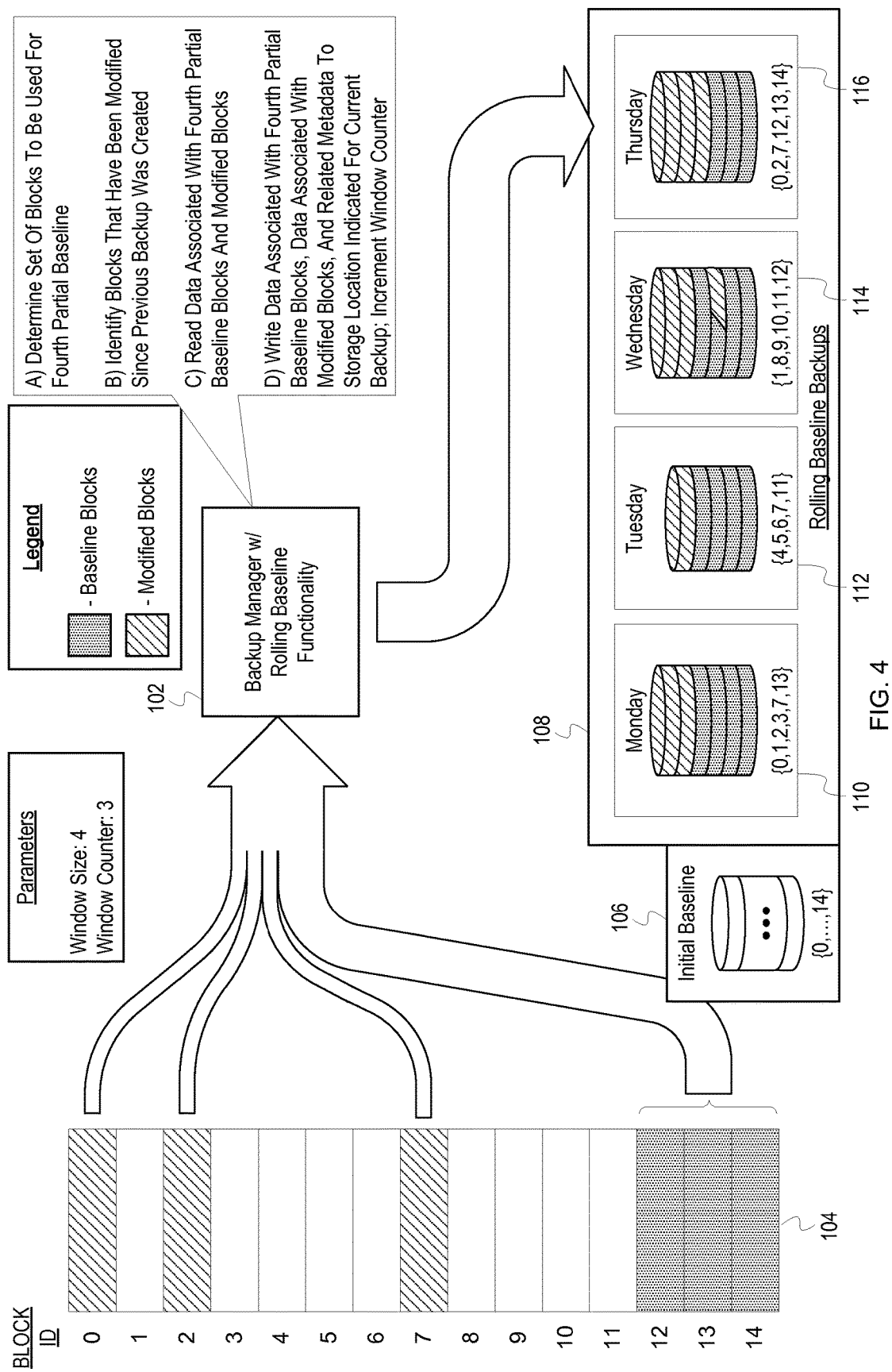
FIG. 4 depicts example operations for generating a fourth backup by a backup manager.

FIG. 4 depicts example operations for generating a fourth backup by a backup manager. Similar to FIGS. 1 through 3, FIG. 4 depicts the backup manager 102 and blocks 104. FIG. 4 also depicts the initial baseline backup 106 and the set of rolling baseline backups 108. When the operations of the backup manager 102 depicted in FIG. 4 are complete, a fourth rolling baseline backup 116 is generated.

At stage A, the backup manager 102 determines a set of the blocks 104 to be used for the fourth partial baseline. To determine the set of the blocks 104 to be used for the fourth partial baseline, the backup manager 102 performs operations similar to those described for stage A of FIG. 1. Because the window size has remained 4, the backup manager 102 determines that four blocks should be used for the fourth partial baseline, as above. In this instance, however, the window counter is now 3, which corresponds to the fourth quarter of blocks 104. The fourth quarter of blocks 104, however, only includes three blocks (as opposed to four): blocks 12 through 14. Thus, the backup manager 102 determines that blocks 12 through 14 should be included in the fourth partial baseline.

At stage B, the backup manager 102 identifies blocks that have been modified since the third rolling baseline backup 114 was generated. The backup manager 102 can identify the blocks that have been modified by performing operations similar to those described for stage B of FIG. 1. In this instance, the backup manager determines that blocks 0, 2, and 7 have been modified since the third rolling baseline backup 114 was generated.

At stage C, the backup manager 102 reads the data associated with the set of blocks determined at stage A and the modified blocks determined at stage B. In this instance, the backup manager 102 reads the data from blocks 0, 2, 7, and 12 through 14.

At stage D, the backup manager 102 writes the data read at stage C to a storage location(s) indicated for the current backup and increments the window counter value. In this example, the fourth rolling baseline backup 116 is written to the appropriate storage location (associated with the backup for Thursday). The backup manager 102 similarly writes any associated metadata (not depicted). For example, the backup manager 102 writes metadata indicating the window size of 4 and the window counter of 3. Further, as above, the backup manager 102 increments the window counter by one. Thus, in this example, the backup manager 102 increments the window counter from 3 to 4.

The operations depicted in FIGS. 1 through 4 are repeated until stopped. However, instead of repeatedly determining which of the blocks 104 comprise the partial baseline, the backup manager 102 can store the block identifiers that comprise each of the partial baselines after identifying the block identifiers the first time. For example, after determining that blocks 0 through 3 comprise the first partial baseline, the backup manager 102 can store a list identifying blocks 0 through 3 as comprising the first partial baseline along with an identifier. The identifier would be the result of the window counter modulo the window size, or 0 for the first partial baseline. The backup manager 102 would do the same for the second, third, and fourth partial baselines Subsequently, to determine the set of blocks to be used, the backup manager 102 computes the result of the current window counter modulo the window size and uses the result to identify the list of blocks that comprise the associated partial baseline. For example, if the window counter was 25, the result of 25 modulo 4 (the window size) is 1. Thus, the backup manager 102 would determine which list was identified by '1' and use the block identifiers of the determined list.

Figure 5:
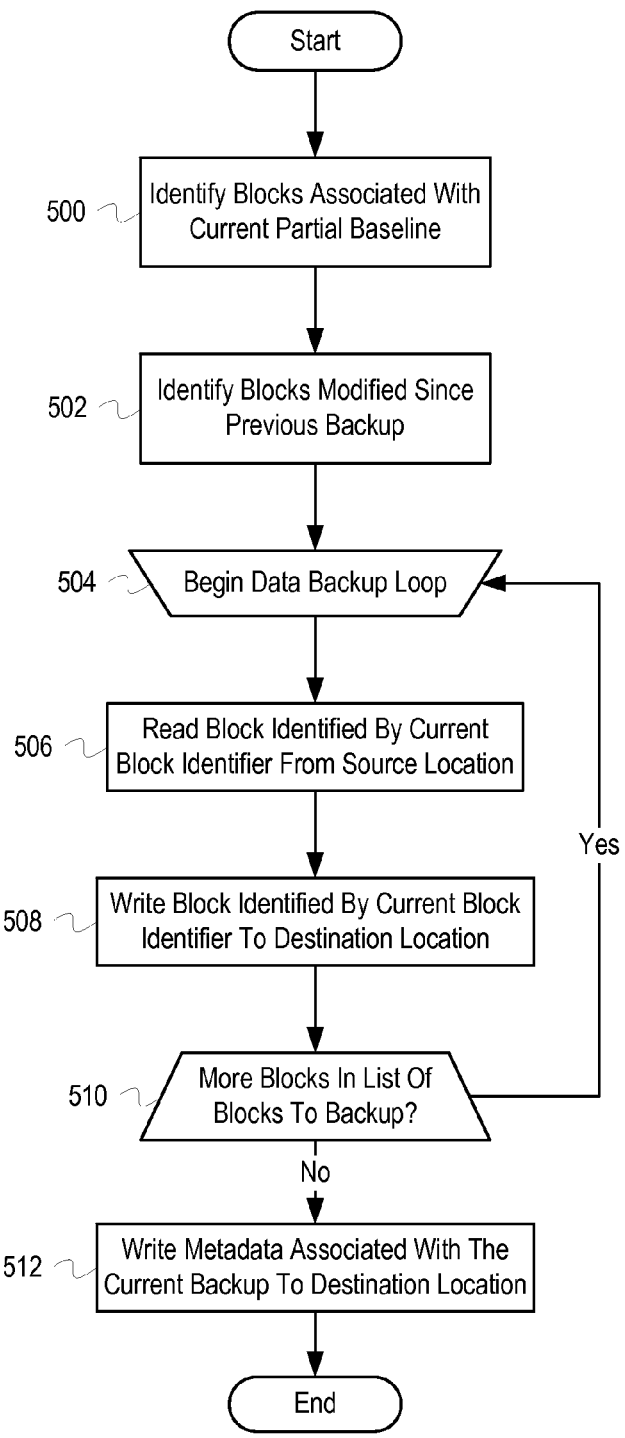
FIG. 5 depicts a flowchart of example operations for generating a partial baseline backup.

FIG. 5 depicts a flowchart of example operations for generating a partial baseline backup. The operations depicted in FIG. 5 can be performed by the backup manager 102 of FIGS. 1 through 4 or any suitable component.

At block 500, a backup manager identifies blocks associated with a current partial baseline. The technique used to identify the blocks associated with the current partial baseline can vary. For example, the backup manager can partition the entire set of blocks to be backed up (i.e., the set of blocks that comprise a complete baseline) into groups of contiguous blocks based on the block identifiers and a window size parameter, as described above. The backup manager can select a particular partition based on a window count parameter. For example, when the window count parameter is 0, the backup manager might identify the blocks of the first partition as being associated with the current partial baseline. When the window count parameter is 1, the backup manager might identify the blocks of the second partition as being associated with the current partial baseline.

As another example, the backup manager can partition the entire set of blocks to be backed up into groups of noncontiguous blocks based on the block identifiers and a window size parameter. To partition the set of blocks, the backup manager can utilize modular arithmetic. For example, if the window size parameter is 4, all blocks with block identifiers evenly divisible by zero comprise a first partition; all blocks with block identifiers evenly divisible by one comprise a second partition; all blocks with block identifiers evenly divisible by two comprise a third partition; and, all blocks with block identifiers evenly divisible by three comprise a fourth partition. The backup manager can select a particular partition by computing the result of the window count modulo the window size. Thus, when the window count parameter is 0, all blocks with block identifiers evenly divisible by zero are selected; when the window count parameter is 6, all blocks with block identifiers evenly divisible by two are selected, etc.

After the backup manager identifies the blocks that are associated with the current partial baseline, control then flows to block 502.

At block 502, the backup manager identifies blocks that have been modified since the previous backup. The technique used by the backup manager to identify the blocks that have been modified since the previous backup can vary. For example, the backup manager might analyze timestamps associated with blocks, read metadata that indicates which blocks were modified, etc. After the backup manager identifies blocks that have been modified since the previous backup, control then flows to block 504.

At block 504, the backup manager begins a data backup loop. During the data backup loop, the backup manager iterates over the set of blocks identified at blocks 500 and 502, reads the blocks from a source location and writes the blocks to a destination location associated with the current backup. On the first pass through block 504, the backup manager initializes a "current block" variable to identify a first block of the set of blocks. On each subsequent pass through block 504, the backup manager updates the current block variable to identify an unprocessed block from the set of blocks. After the backup manager initializes or updates the current block variable, control then flows to block 506.

At block 506, the backup manager reads the block identified by the current block variable from a source location. To read the block, the backup manager can pass a block identifier associated with the block to a file system manager or other component. After the backup manager reads the block identified by the current block variable from the source location, control then flows to block 508.

At block 508, the backup manager writes the block identified by the current block variable to a destination location associated with the current backup. To write the block, the backup manager can pass the data associated with the block (by reference or directly) to a file system manager or other component and identify the destination location. After the backup manager writes the block identified by the current block variable to the destination location associated with the current backup, control then flows to block 510.

At block 510, the backup manager determines whether there are additional blocks to backup. The backup manager can determine whether there are additional blocks to backup by determining whether the end of a list has been reached, whether a block identifier associated with the current block parameter has reached a maximum value, etc. If the backup manager determines that there are no additional blocks to backup, control then flows to block 512. If the backup manager determines that there are additional blocks to backup, control then flows back to block 504.

At block 512, the backup manager writes metadata associated with the current backup to the destination location. The particular metadata written can vary. For example, the metadata can include the window size and window counter parameters, whether the backup data is compressed, etc. The destination location can be the same as the destination location that the blocks are written to at block 508 or can be a separate location. After the backup manager writes the metadata associated with the current backup to the destination location, the process ends.

While the examples described above assume that each backup occurs on a daily basis, the backups can occur at any interval. For example, in some instances, the time available in which a backup can be performed (hereinafter "backup window") might vary depending on the particular day of the week. On a weekday, for example, the backup window might be four hours during the night. On a Sunday, however, the backup window might be twelve hours during the day. The backup manager can take advantage of longer backup windows by generating multiple partial baseline backups. For example, on each weekday the backup manager might generate a single partial baseline backup as described above. On Sunday, however, the backup manager might generate three partial baseline backups. As above, the backup manager increments the window counter after each partial baseline backup is generated, even if each partial baseline backup is generated on the same day.

Applicability to Other Data Unit Types

As mentioned above, the examples described herein are not limited to the specific data unit types described. For example, the techniques described above can be adapted for use with inodes. An inode is a collection of pointers that point to blocks (logical or physical; direct or indirect) or other inodes, thus (potentially) resulting in a hierarchical structure. Similar to blocks being identified by block identifiers, inodes can be identified by inode identifiers. Thus, the techniques described above for partitioning a set of blocks can be used to partition inodes. However, to facilitate recreation of the hierarchical structure associated with the inodes, the backup manager can include all parent inodes between a selected inode and a root inode. For example, if the backup manager determines that a particular inode is to be backed up, the backup manager also determines that the parent of the inode is to be backed up as well. If the parent of the inode is not a root inode, the backup manager determines that the grandparent of the inode is to be backed up as well. The backup manager thus works up the hierarchy until a root inode is reached. Additional examples are described below.

Partitioning Technique Examples

As mentioned above, various techniques can be used to identify which blocks (or other data unit types) are associated with a particular partial baseline. FIGS. 6 through 12 provide examples of particular techniques that can be used to identify which data units to use for a particular partial baseline.

Figure 6:
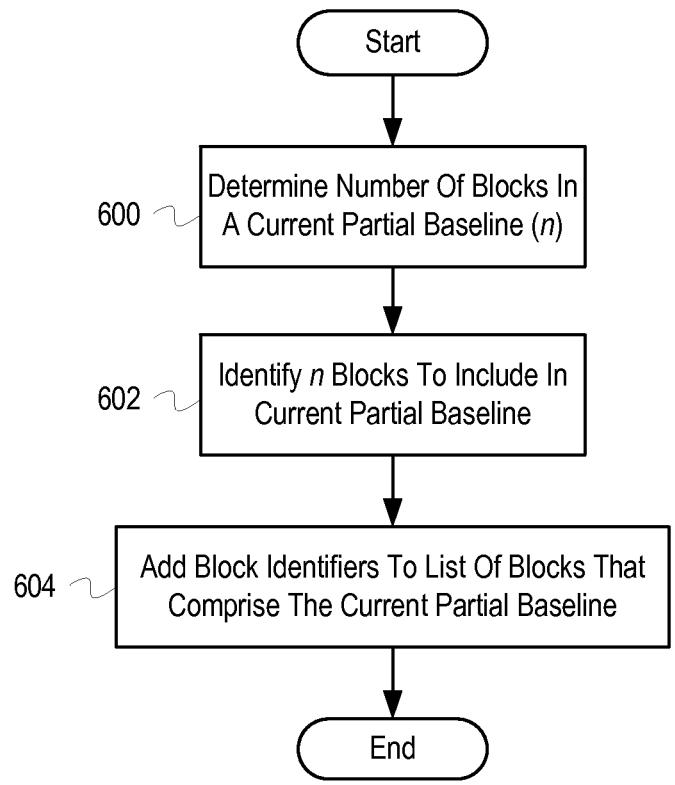
FIG. 6 depicts a flowchart of example operations for identifying "contiguous" blocks associated with a particular partial baseline.

FIG. 6 depicts a flowchart of example operations for identifying "contiguous" blocks associated with a particular partial baseline. The operations depicted in FIG. 6 can be performed by the backup manager 102 of FIGS. 1 through 4 or any suitable component.

At block 600, a backup manager determines a number of blocks in a current partial baseline. To determine the number of blocks in the current partial baseline, the backup manager divides the total number of blocks that comprise the complete baseline by a window size. If the resulting quotient, n, is not an integer, the backup manager can round the quotient up to the nearest integer. In some instances, the backup manager can use non-integer values of n without modification. The value of n remains the same unless the total number of blocks that comprise the complete baseline changes or the window size changes. Thus, after initially calculating n, the resulting value can be stored for future use, thus reducing the number of repetitive calculations. Thus, prior to calculating n, the backup manager might determine if n has already been calculated and, if so, use the stored value of n. The backup manager might also determine whether the total number of blocks that comprise the complete baseline has changed or whether the window size has changed. In such instances, the backup manager recalculates n even if n was previously calculated and stored for later use. After the backup manager determines the number of blocks in the current partial baseline, control then flows to block 602.

At block 602, the backup manager identifies n blocks to include in the current partial baseline. The backup manager can identify the n blocks using various techniques. As a first example, the backup manager can directly compute the block identifiers if the block identifiers are sequential (e.g., 0, . . . , m). To compute the first block identifier, x, the backup manager multiplies n, determined at block 600, by the current window counter value. To compute the last block identifier, y, the backup manager adds n−1 to x. The n blocks identified by the block identifiers x through y are the blocks included in the current partial baseline.

If the block identifiers are not sequential (e.g., 0, . . . , 5, 10, . . . 19), the backup manager can iterate over a list of the block identifiers to determine the blocks to include in the partial baseline. In particular, the backup manager can compute an index into the list to identify the position of the first block identifier. The index into the list is x, computed above (n multiplied by the current window counter value). The backup manager thus iterates over the block identifiers in the list until the $x^{th}$ block identifier is reached. The backup manager then iterates over the next n block identifiers in the list, marking or otherwise indicating that each block identifier as being associated with the current partial baseline. After the backup manager identifies the n blocks to include in the current partial baseline, control then flows to block 604.

At block 604, the backup manager adds the block identifiers to a list of blocks that comprise the current partial baseline. After the backup manager adds the block identifiers to the list of blocks that comprise the current partial baseline, the process ends.

Figure 7:
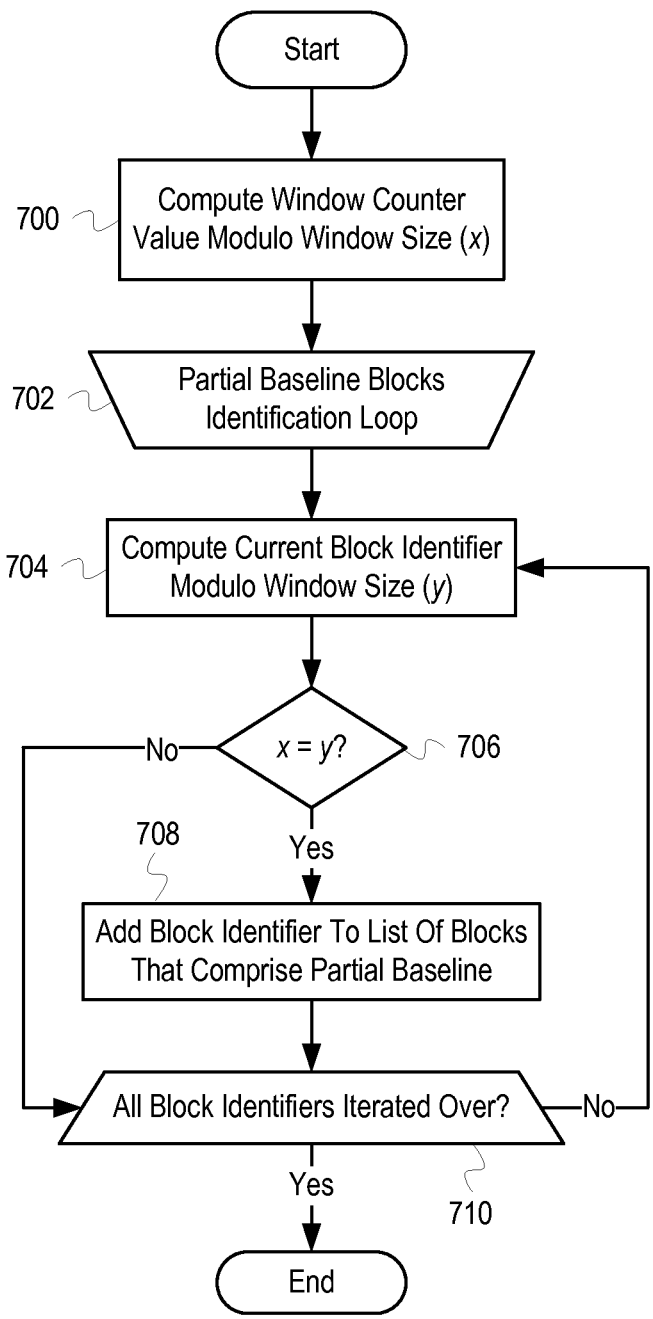
FIG. 7 depicts a flowchart of example operations for using modular arithmetic to identify blocks associated with a particular partial baseline.

FIG. 7 depicts a flowchart of example operations for using modular arithmetic to identify blocks associated with a particular partial baseline. The operations depicted in FIG. 7 can be performed by the backup manager 102 of FIGS. 1 through 4 or any suitable component.

At block 700, a backup manager computes the result, x, of a window counter value modulo a window size. After the backup manager computes x, control then flows to block 702.

At block 702, the backup manager begins a partial baseline block identification loop. During the first pass through block 702, the backup manager initializes a current block identifier to be a first of the set of block identifiers associated with all blocks being backed up. On each subsequent pass through block 702, the backup manager updates the current block identifier to be an unprocessed block identifier from the set of block identifiers. After the backup manager initializes or updates the current block identifier, control then flows to block 704.

At block 704, the backup manager computes the result, y, of the current block identifier modulo the window size. After the backup manager computes y, control then flows to block 706.

At block 706, the backup manager determines whether x is equal to y. If x is equal to y, control then flows to block 708. If x is not equal to y, control then flows to block 710.

At block 708, the backup manager adds the block identifier to a list of blocks that comprise the partial baseline. The list can be implemented as a list or other data structure. After the backup manager adds the block identifier to the list of blocks that comprise the partial baseline, control then flows to block 710.

At block 710, the backup manager determines whether all blocks have been iterated over. If the backup manager determines that all blocks have not been iterated over, control then flows back to block 704. If the backup manager determines that all blocks have been iterated over, the process ends.

Figure 8:
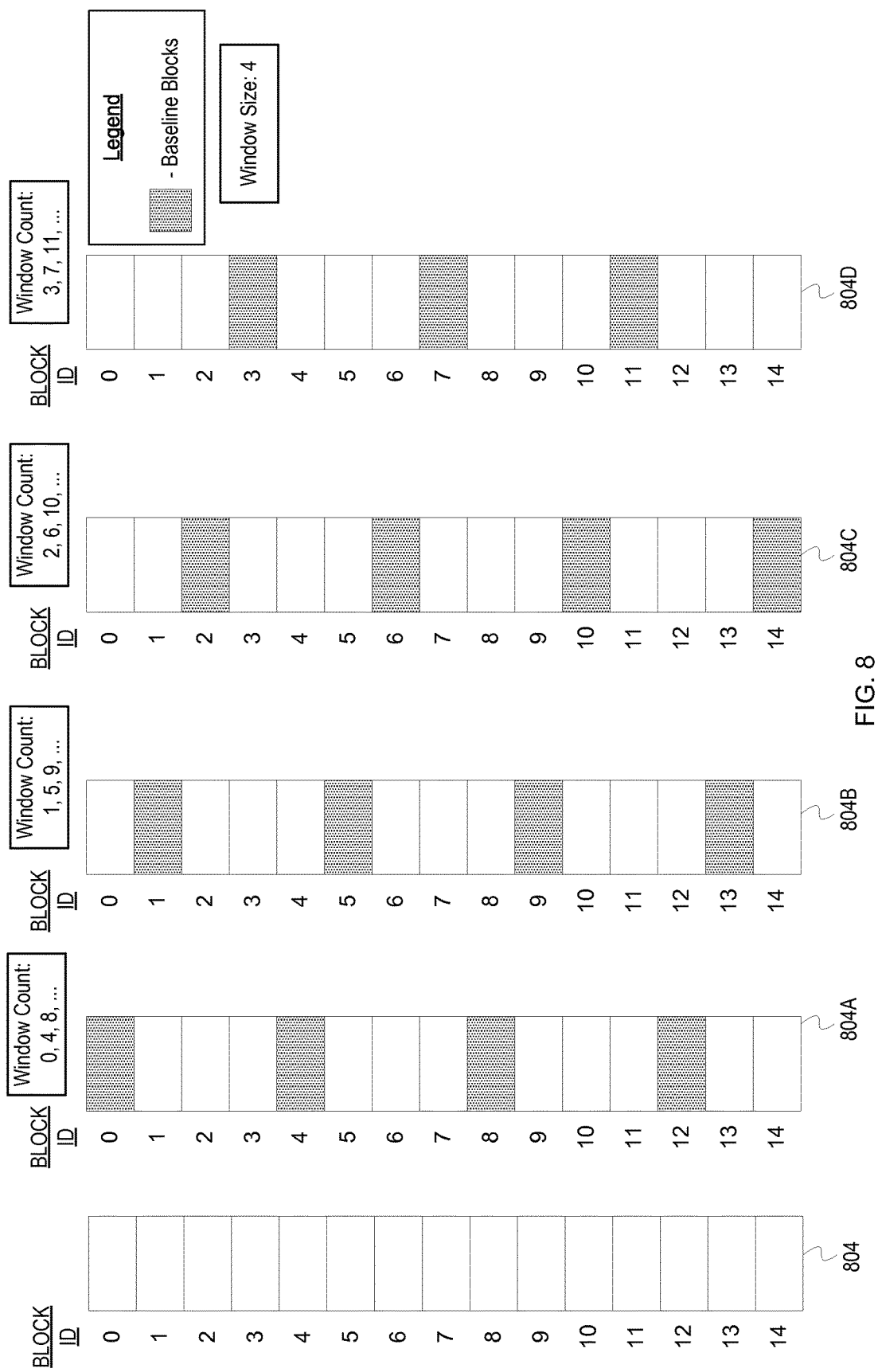
FIG. 8 depicts a visual representation of the blocks identified for a set of partial baselines using modular arithmetic.

FIG. 8 depicts a visual representation of the blocks identified for a set of partial baselines using modular arithmetic, as described in relation to FIG. 7. FIG. 8 depicts a set of blocks 804 and four subsets of blocks 804A-804D based on particular window count values. Similar to FIGS. 1 through 4, blocks 804 are the blocks being backed up and are represented by block identifiers 0 through 14. In this example, the window size parameter is 4 and the blocks identified for each particular partial baseline are indicated by a dotted pattern.

Block subset 804A depicts the subset of blocks that comprise the partial baseline associated with window counts 0, 4, 8, etc. When the window count is 0, 4, 8, etc., x, as defined in relation to FIG. 7, is 0. Thus, any block with a block identifier that is evenly divisible by 4 (i.e., has no remainder), is identified as comprising the partial baseline. Thus, the blocks identified by block identifiers 0, 4, 8, and 12 comprise the partial baseline associated with window counts 0, 4, 8, etc.

Block subset 804B depicts the subset of blocks that comprise the partial baseline associated with window counts 1, 5, 9, etc. When the window count is 1, 5, 9, etc., x, as defined in relation to FIG. 7, is 1. Thus, any block with a block identifier which, when divided by 4, has a remainder of 1 is identified as comprising the partial baseline. Thus, the blocks identified by block identifiers 1, 5, 9, and 13 comprise the partial baseline associated with window counts 1, 5, 9, etc.

Block subset 804C depicts the subset of blocks that comprise the partial baseline associated with window counts 2, 6, 10, etc. When the window count is 2, 6, 10, etc., x, as defined in relation to FIG. 7, is 2. Thus, any block with a block identifier which, when divided by 4, has a remainder of 2 is identified as comprising the partial baseline. Thus, the blocks identified by block identifiers 2, 6, 10, and 14 comprise the partial baseline associated with window counts 2, 6, 10, etc.

Block subset 804D depicts the subset of blocks that comprise the partial baseline associated with window counts 3, 7, 11, etc. When the window count is 3, 7, 11, etc., x, as defined in relation to FIG. 7, is 3. Thus, any block with a block identifier which, when divided by 4, has a remainder of 3 is identified as comprising the partial baseline. Thus, the blocks identified by block identifiers 3, 7, and 11 comprise the partial baseline associated with window counts 3, 7, 11, etc.

As another example, a bitmap (or similar data structure) can be used in conjunction with modular arithmetic to identify blocks associated with a particular partial baseline. Consider a bitmap represented as the binary value 0b0100 and a window size of four. To determine whether a particular block is associated with a particular partial baseline, a backup manager computes the result, y, of the block identifier modulo the window size. The backup manager then determines whether y corresponds with a bit set to 1 in the bitmap. If the corresponding bit is 1, the backup manager determines that the block is associated with the particular partial baseline. For example, if the block identifier is 9, y is 1. Thus, the backup manager determines whether the bit in the $1^{st}$ position is 1. In the example bitmap (0b0100), the bit in the $1^{st}$ position is 0. Thus, the backup manager determines that the block identified by block identifier 9 is not part of the particular partial baseline. If the block identifier is 10, however, y is 2. Thus, the backup manager determines whether the bit in the $2^{nd}$ position is 1. In the example bitmap (0b0100), the bit in the $2^{nd}$ position is 1. Thus, the backup manager determines that the block identified by block identifier 1 is part of the particular partial baseline.

The bitmaps can be configurable. For example, a storage system might include configuration data. The configuration data can include a set of bitmaps that are read by, or passed to, the backup manager. For example, the bitmaps might be passed to the backup manager on a round-robin basis, based on the particular day of the week, etc. The storage system can include a user interface that facilitates the creation of the bitmaps by a user.

Each of the partial baselines that comprises the complete baseline is specified by a bitmap. Thus, the number of bits in the bitmap is equal to the window size. For example, the bitmap above includes four bits, corresponding to the window size of four.

The technique depicted in FIG. 7, above, can be emulated by using bitmaps that are successively bitshifted left. For example, if the window size is four, using the following bitmaps for successive partial baselines emulates the technique depicted in FIG. 7 when the window size is also four: 0b0001; 0b0010; 0b0100; and, 0b1000. Unlike the technique depicted in FIG. 7, the use of bitmaps allows the blocks that comprise the partial baselines to be partitioned in a non-sequential manner. This use of bitmaps is illustrated below.

Figure 9:
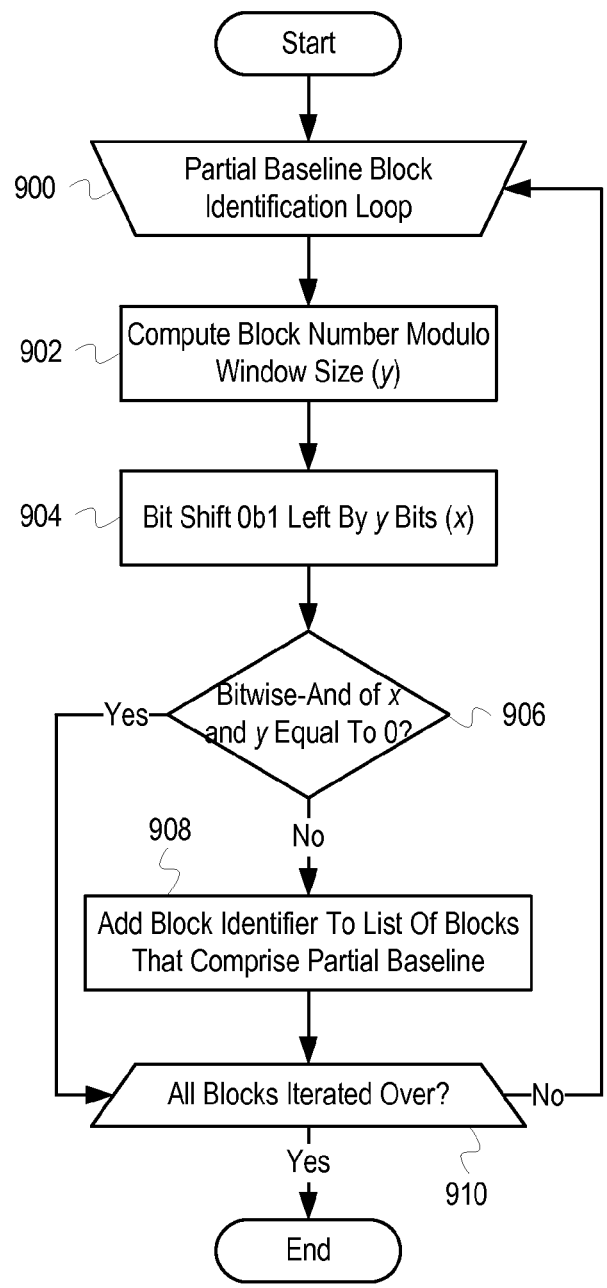
FIG. 9 depicts a flowchart of example operations for using bitmaps to identify blocks associated with a particular partial baseline.

FIG. 9 depicts a flowchart of example operations for using bitmaps to identify blocks associated with a particular partial baseline. The operations depicted in FIG. 9 can be performed by the backup manager 102 of FIGS. 1 through 4 or any suitable component.

At block 900, the backup manager begins a partial baseline block identification loop. During the first pass through block 900, the backup manager initializes a current block identifier to be a first of the set of block identifiers associated with all blocks being backed up. On each subsequent pass through block 900, the backup manager updates the current block identifier to be an unprocessed block identifier from the set of block identifiers. After the backup manager initializes or updates the current block identifier, control then flows to block 902.

At block 902, the backup manager computes the result, y, of the current block identifier modulo the window size. After the backup manager computes y, control then flows to block 904.

At block 904, the backup manager bit shifts 0b1 left by y bits (x). Bit shifting 0b1 left by y bits effectively identifies which bit of the bitmap corresponds to the current block identifier. For example, if y is 2, x is 0b0100, identifying the $2^{nd}$ bit position as corresponding to the current block identifier. After the backup manager bit shifts 0b1 left by y bits, control then flows to block 906.

At block 906, the backup manager determines whether the bitwise- and of x and y is equal to zero. In other words, the backup manager performs a bitwise- and operation using x and y and compares the result to zero. The result of the bitwise- and operation is not zero if the 1 bit in x matches a 1 bit in the bitmap. If the backup manager determines that the bitwise- and of x and y is not equal to zero, control then flows to block 908. If the backup manager determines that the bitwise- and of x and y is equal to zero, control then flows to block 910.

At block 908, the backup manager adds the block identifier to a list of blocks that comprise the partial baseline. The list can be implemented as a list or other data structure. After the backup manager adds the block identifier to the list of blocks that comprise the partial baseline, control then flows to block 910.

At block 910, the backup manager determines whether all blocks have been iterated over. If the backup manager determines that all blocks have not been iterated over, control then flows back to block 900. If the backup manager determines that all blocks have been iterated over, the process ends.

Figure 10:
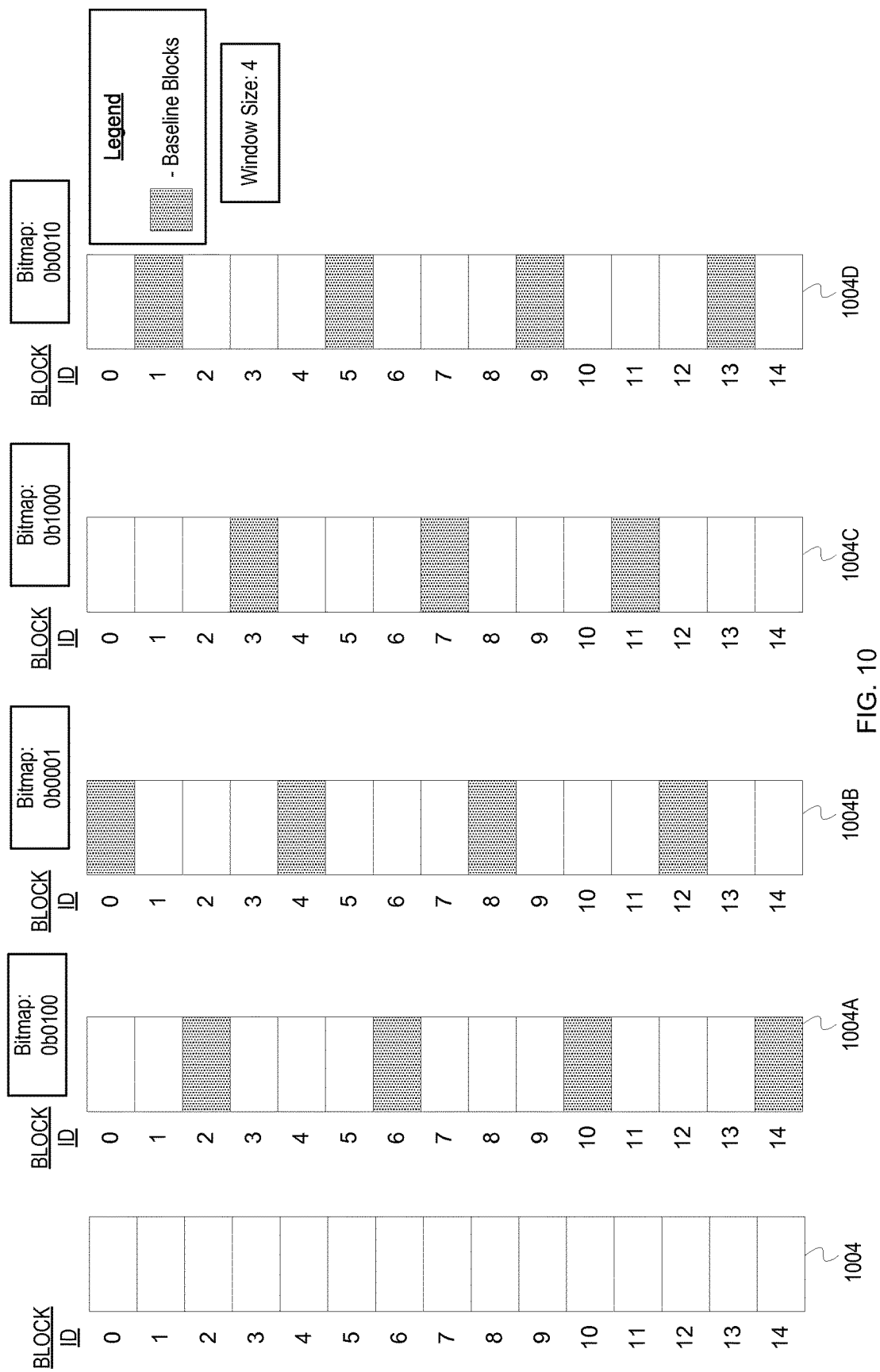
FIG. 10 depicts a visual representation of the blocks identified for a set of partial baselines using bitmaps.

FIG. 10 depicts a visual representation of the blocks identified for a set of partial baselines using bitmaps. FIG. 10 depicts a set of blocks 1004 and four subsets of blocks 1004A-1004D based on particular bitmaps. Similar to FIGS. 1 through 4, blocks 1004 are the blocks being backed up and are represented by block identifiers 0 through 14. In this example, the window size parameter is 4 and the blocks identified for each particular partial baseline are indicated by a dotted pattern.

Block subset 1004A depicts the subset of blocks that comprise the partial baseline associated with the bitmap 0b0100. When the bitmap is 0b0100, the 1 in the bitmap corresponds to any block identified by a block identifier which, when divided by 4, results in a remainder of 2 (i.e., when the block identifier modulo 4 is 2). Thus, the blocks identified by block identifiers 2, 6, 10, and 14 comprise the partial baseline associated with the bitmap 0b0100.

Block subset 1004B depicts the subset of blocks that comprise the partial baseline associated with the bitmap 0b0001. When the bitmap is 0b0001, the 1 in the bitmap corresponds to any block identified by a block identifier which is evenly divisible by 4 (i.e., when the block identifier modulo 4 is 0). Thus, the blocks identified by block identifiers 0, 4, 8, and 12 comprise the partial baseline associated with the bitmap 0b0001.

Block subset 1004C depicts the subset of blocks that comprise the partial baseline associated with the bitmap 0b1000. When the bitmap is 0b1000, the 1 in the bitmap corresponds to any block identified by a block identifier which, when divided by 4, results in a remainder of 3 (i.e., when the block identifier modulo 4 is 3). Thus, the blocks identified by block identifiers 3, 7, and 11 comprise the partial baseline associated with the bitmap 0b1000.

Block subset 1004D depicts the subset of blocks that comprise the partial baseline associated with the bitmap 0b0010. When the bitmap is 0b0010, the 1 in the bitmap corresponds to any block identified by a block identifier which, when divided by 4, results in a remainder of 1 (i.e., when the block identifier modulo 4 is 1). Thus, the blocks identified by block identifiers 1, 5, 9, and 13 comprise the partial baseline associated with the bitmap 0b0010.

After using each of the four bitmaps, the bitmaps would be reused in the same order. Thus, similar to the technique described in FIG. 7 and illustrated in FIG. 8, the use of a bitmap results in partial baselines that include noncontiguous and evenly distributed groups of blocks. Similarly, any four sequential partial baselines can be combined to create the complete baseline.

However, unlike the technique described in FIG. 7 and illustrated in FIG. 8, the technique described in FIG. 9, the particular blocks that comprise a particular partial baseline are not purely determined using modular arithmetic. Thus, instead of each partial baseline including the next sequential block, the particular set of blocks can be indicated using a bitmap, allowing additional flexibility.

It should be noted that a single bitmap can be used to, effectively, specify that multiple partial baseline backups should be made. For example, the bitmap 0b1100 causes the backup manager to include blocks that would be included by using 0b1000 and blocks that would be included by using 0b0100. Thus, the bitmap 0b1100 is effectively equivalent to performing the operations depicted in FIG. 9 twice using the bitmap 0b1000 once and the bitmap 0b0100 once. This can allow the backup manager to take advantage of longer backup windows, similar to above. However, instead of performing multiple partial baseline backups when the backup window is longer, the backup manager performs a single partial baseline backup, but selects a larger number of blocks for the baseline.

While the technique used by the backup manager to identify inodes that are associated with a particular partial baseline is similar to that used to identify blocks associated with a particular partial baseline, the backup manager also takes into account the hierarchical structure implemented by file systems. Because the modification of a particular inode can result in the modification to parent inodes up to a root inode, the backup manager also identifies the parent inodes of any inodes that comprise a particular partial baseline.

Figure 11:
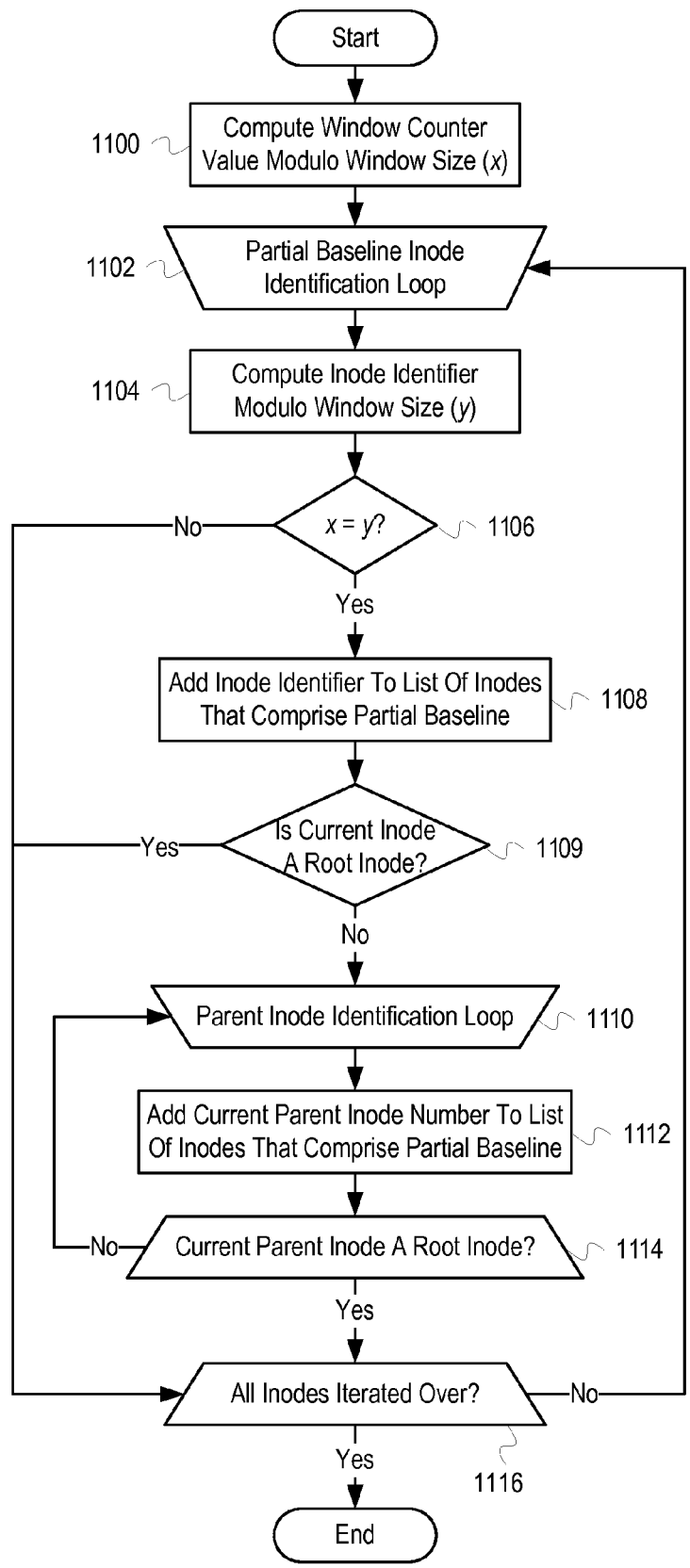
FIG. 11 depicts a flowchart of example operations for using modular arithmetic to identify inodes associated with a particular partial baseline.

FIG. 11 depicts a flowchart of example operations for using modular arithmetic to identify inodes associated with a particular partial baseline. The operations depicted in FIG. 11 can be performed by the backup manager 102 of FIGS. 1 through 4 or any suitable component.

At block 1100, a backup manager computes the result, x, of the window counter value modulo a window size. After the backup manager computes x, control then flows to block 1102.

At block 1102, the backup manager begins a partial baseline inode identification loop. During the first pass through block 1102, the backup manager initializes a current inode identifier to be a first of the set of inode identifiers associated with all inodes being backed up. On each subsequent pass through block 1102, the backup manager updates the current inode identifier to be an unprocessed inode identifier from the set of inode identifiers. The inode identified by the current inode identifier is the "current inode". After the backup manager initializes or updates the current inode identifier, control then flows to block 1104.

At block 1104, the backup manager computes the result, y, of the current inode identifier modulo the window size. After the backup manager computes y, control then flows to block 1106.

At block 1106, the backup manager determines whether x is equal to y. If x is equal to y, control then flows to block 1108. If x is not equal to y, control then flows to block 1116.

At block 1108, the backup manager adds the inode identifier to a list of inodes that comprise the partial baseline. The list can be implemented as a list or other data structure. After the backup manager adds the inode identifier to the list of inodes that comprise the partial baseline, control then flows to block 1109.

At block 1109, the backup manager determines whether the current inode is a root inode. A root inode can be defined in various ways. For example, a root inode might be an inode that does not have a parent inode. As another example, a root inode might be an inode that is explicitly indicated as being a root inode (i.e., a root inode might still have a parent inode). Thus, the particular technique used by the backup manager to determine whether the current inode is a root inode can vary. For example, the backup manager might determine whether the inode has a reference to a parent inode or whether the inode is associated with an explicit indication that the inode is a root inode. Whether the inode has a parent inode or is a root inode can be indicated in a data structure representing the inode. If the backup manager determines that the current inode is a root inode, control then flows to block 1110. If the backup manager determines that the current inode is not a root inode, control then flows to block 1116.

At block 1110, the backup manager begins a parent inode identification loop. During the first pass through block 1102, the backup manager initializes a current parent inode to be the parent inode of the current inode. On each subsequent pass through block 1102, the backup manager updates the current parent inode to be the parent inode of the previous current parent inode. After the backup manager initializes or updates the current parent inode, control then flows to block 1112.

At block 1112, the backup manager adds the inode identifier that identifies the current parent inode to the list of inodes that comprise the partial baseline. After the backup manager adds the inode identifier that identifies the current parent inode to the list of inodes that comprise the partial baseline, control then flows to block 1114.

At block 1114, the backup manager determines whether the current inode is a root inode. To determine whether the current inode is a root inode, the backup manager can perform operations substantially similar to those performed at block 1109. If the backup manager determines that the current inode is a root inode, control then flows to block 1116. If the backup manager determines that the current inode is not a root inode, control then flows back to block 1110.

Control flowed to block 1116 if the backup manager determined, at block 1106, that x was equal to y. Control also flowed to block 1116 the backup manager determined, at block 1109, that the current inode is a root inode. Control also flowed to block 1116 if the backup manager determined, at block 1114, that the current parent inode is a root inode. At block 1116, the backup manager determines whether all inodes have been iterated over. If the backup manager determines that all inodes have not been iterated over, control then flows back to block 1104. If the backup manager determines that all inodes have been iterated over, the process ends.

The technique used by the backup manager to identify files that are associated with a particular partial baseline is also similar to that used to identify blocks associated with a particular partial baseline. However, while files might be identified by a file number, similar to a block identifier, files are usually identified by a file path as well. A file path generally identifies a particular location within a file system and is typically specified using alphanumeric characters (i.e., not a single integer). Thus, modular arithmetic might not be directly applicable to a file path. However, the backup manager can convert the file path to an integer, allowing the backup manager to perform similar operations on the file path as performed on the block identifiers. While the backup manager could treat the digital representation of the file path as an integer directly, the digital representation of the file path might be unnecessarily long. Thus, the backup manager can compute an integer hash of the file path and utilize the integer hash as the file identifier.

Figure 12:
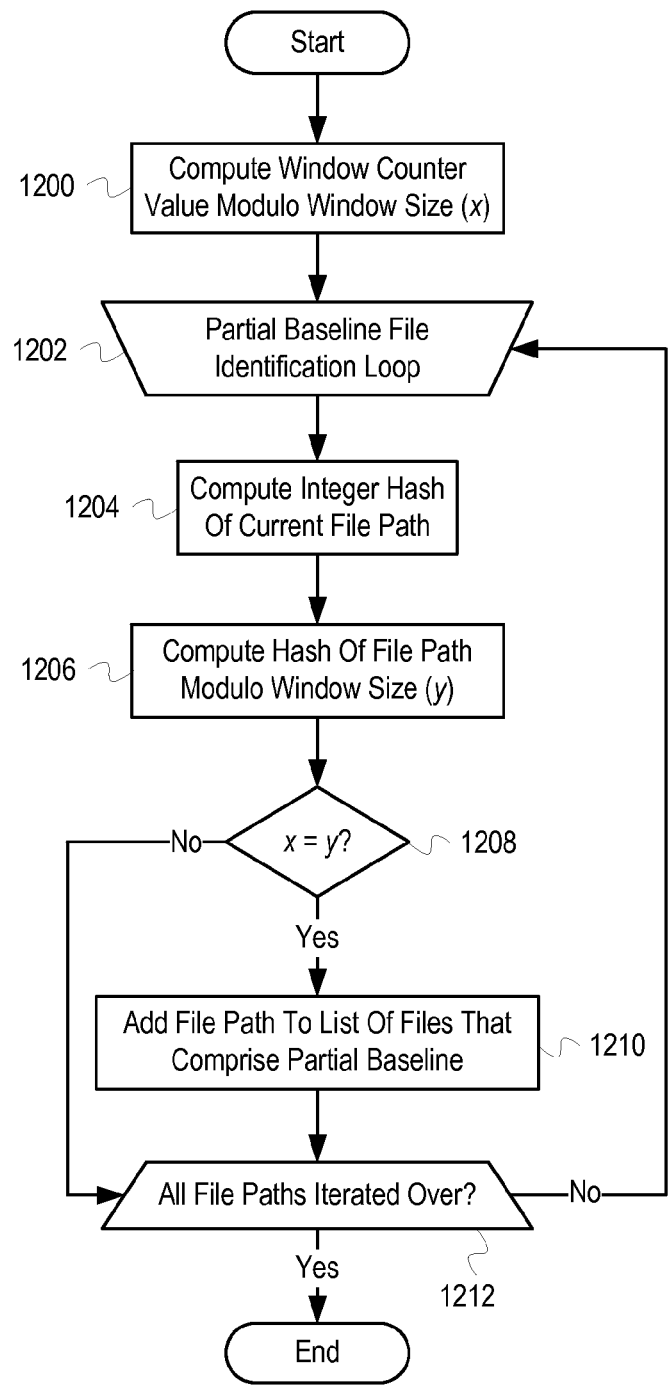
FIG. 12 depicts a flowchart of example operations for using modular arithmetic to identify files associated with a particular partial baseline.

FIG. 12 depicts a flowchart of example operations for using modular arithmetic to identify files associated with a particular partial baseline. The operations depicted in FIG. 12 can be performed by the backup manager 102 of FIGS. 1 through 4 or any suitable component.

At block 1200, a backup manager computes the result, x, of the window counter value modulo a window size. After the backup manager computes x, control then flows to block 1202.

At block 1202, the backup manager begins a partial baseline file identification loop. During the first pass through block 1202, the backup manager initializes a current file path to be a first of the set of file paths associated with all files being backed up. On each subsequent pass through block 1202, the backup manager updates the current file path to be an unprocessed file path from the set of file paths. After the backup manager initializes or updates the current file path, control then flows to block 1204.

At block 1204, the backup manager computes the integer hash of the current file path. The backup manager can use any of a number of hashing techniques to compute the integer hash of the current file path (e.g., SHA-1, MD5, etc.) After the backup manager computes the integer hash of the current file path, control then flows to block 1206.

At block 1206, the backup manager computes the result, y, of the integer hash modulo the window size. After the backup manager computes y, control then flows to block 1208.

At block 1208, the backup manager determines whether x is equal to y. If x is equal to y, control then flows to block 1210. If x is not equal to y, control then flows to block 1212.

At block 1210, the backup manager adds the file path to a list of files that comprise the partial baseline. The list can be implemented as a list or other data structure. After the backup manager adds the file path to the list of files that comprise the partial baseline, control then flows to block 1212.

At block 1212, the backup manager determines whether all file paths have been iterated over. If the backup manager determines that all file paths have not been iterated over, control then flows back to block 1202. If the backup manager determines that all file paths have been iterated over, the process ends.

The above techniques are only a few of the possible techniques that can be used to identify data units that comprise particular partial baselines. Other techniques can be used for the example data unit types described above. Similarly, the techniques can be used for other data unit types, including volumes, partitions, drives, etc.

Restoring Data Using Partial Baseline Backups

When data loss occurs to a storage system, the data might be restored using previously generated backups. To restore data using partial baseline backups, a backup manager determines a set of partial baseline backups which provide a complete baseline of the data prior to the data loss. For example, consider a backup manager that performs daily backups that include partial baselines based on a window size of four. A user identifies a date that the data loss occurred and provides the date to the backup manager. The backup manager then uses the window size to determine the set of partial baselines that can be used to create a complete baseline. For example, if the user indicates that the data loss occurred on a Friday, the backup manager determines that backups generated on Monday, Tuesday, Wednesday, and Thursday include partial baselines that can be combined to create a complete baseline (based on a window size of four). When combined with the incremental backups stored with the partial baselines, the backups generated on Monday, Tuesday, Wednesday, and Thursday can be used to restore the data up to the point at which the backup on Thursday was generated. The date on which the data loss occurs is referred to herein as the "critical date".

Once the appropriate backups are identified, the backup manager can read the data from each of the backups and write the data to the appropriate locations in a storage system.

FIGS. 13 through 16 depict the operations performed by a backup manager to restore data from a set of rolling baseline backups. In particular, each of FIGS. 13, 14, 15, and 16 depict the operations performed to restore the data that comprises a particular partial baseline backup.

Figure 13:
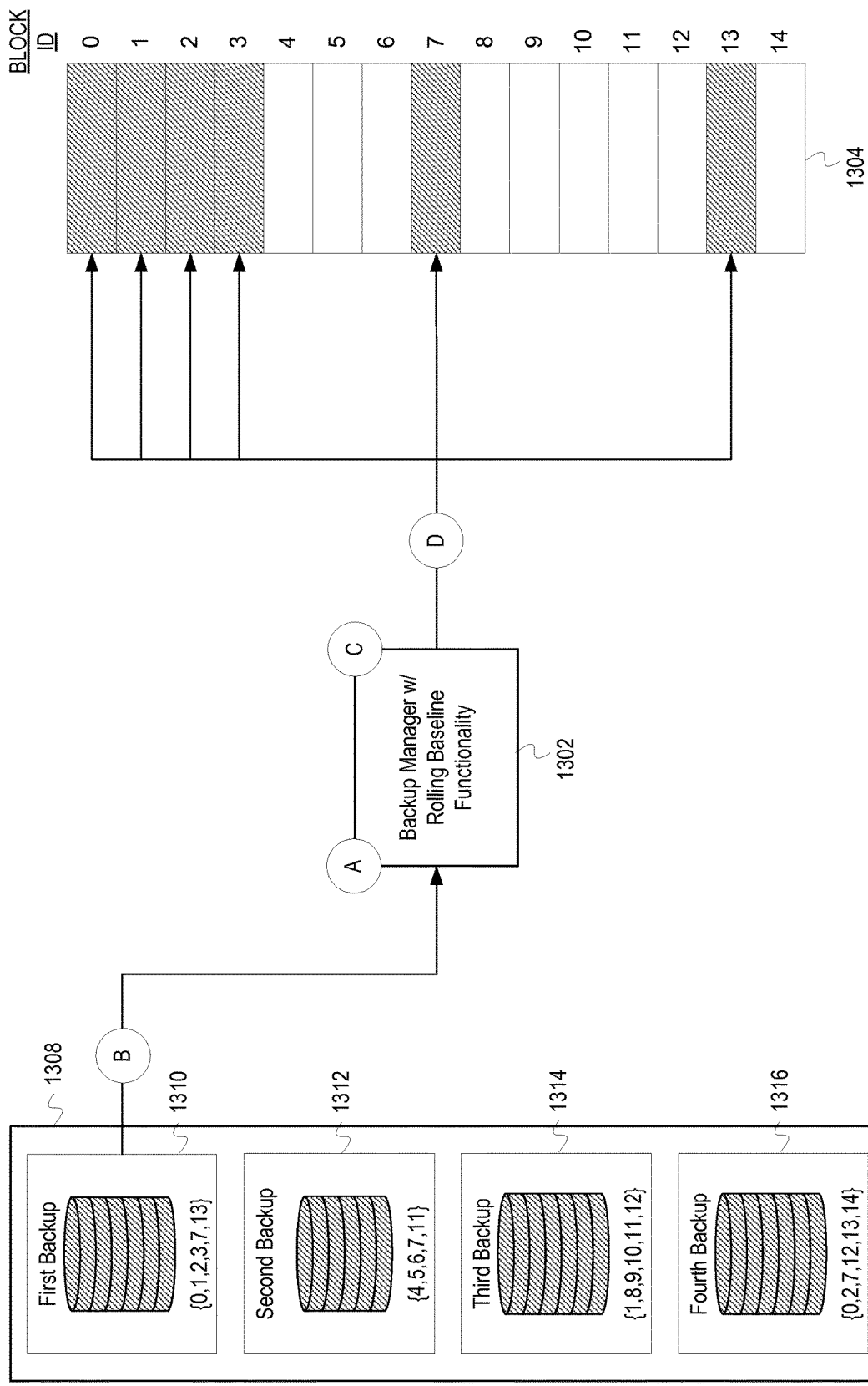
FIG. 13 depicts example operations of a backup manager for restoring part of storage system data using a first partial baseline backup.

FIG. 13 depicts example operations of a backup manager for restoring part of storage system data using a first partial baseline backup. FIG. 13 depicts a backup manager 1302 and a set of blocks 1304. The set of blocks 1304 represent blocks on a storage system (not depicted). FIG. 13 also depicts a set of rolling baseline backups 1308. The rolling baseline backups 1308 include backups 1310, 1312, 1314, and 1316. Each of the backups includes a partial baseline backup and can include incremental backups (not depicted individually). The individual blocks of the set of blocks 1304 are depicted with a striped pattern after data from the rolling baseline backups 1308 has been written to each respective individual block.

At stage A, the backup manager 1302 identifies the set of partial baseline backups that can be combined to create a complete baseline. To identify the set of partial baseline backups, the backup manager 1302 determines the critical date. In some instances, the backup manager 1302 is notified of the critical date by a user or other component. For example, a user might input a date that corresponds to the data loss. As another example, a component responsible for monitoring the status of the storage system might determine that a data loss has occurred and notify the backup manager 1302 of the critical date. In some instances, the backup manager 1302 determines the critical date itself. For example, the backup manager 1302 might assume that the date after the date on which the most recent backup was generated is the critical date.

Once the backup manager 1302 has identified the critical date, the backup manager 1302 identifies the n partial baseline backups that were generated prior the critical date, where n is the window size. In the example above, the window size was four, the partial baseline backups were generated daily, and the critical date was Friday. Thus, the backup manager 1302 would identify the partial baseline backups that were generated on Monday, Tuesday, Wednesday, and Thursday. In this particular example, the backup manager 1302 identifies backups 1310, 1312, 1314, and 1316 as containing the partial baseline backups that can be combined to create the complete baseline.

At stage B, the backup manager 1302 reads the data associated with the first backup 1310. To read the data associated with the first backup 1310, the backup manager 1302 can identify a location at which the first backup 1310 is stored. To identify the location, the backup manager 1302 might lookup metadata associated with the first backup 1310. In some instances, a user might indicate the associated location. Once the backup manager 1302 has identified the location at which the first backup 1310 is stored, the backup manager 1302 reads the associated data.

At stage C, the backup manager 1302 processes the first backup 1310. The processing performed by the backup manager 1302 can vary. For example, the first backup 1310 might be stored compressed, encrypted, or in a particular format. The backup manager 1302 can thus decompress, decrypt, or reformat/extract the data associated with the first backup 1310 if appropriate. The backup manager 1302 also identifies the particular data that comprises the first backup 1310. In this example, the backup manager 1302 determines that the first backup 1310 includes data for blocks 0, 1, 2, 3, 7, and 13. The particular operations performed to identify the data that comprises the first backup 1310 can vary depending on the format of the first backup 1310, how the first backup 1310 is read at stage B, etc. Blocks 0, 1, 2, and 3 comprise the partial baseline backup while blocks 7 and 13 comprise the incremental backup.

In this particular instance, the backup manager 1302 does not differentiate between the partial baseline backup and the incremental backup. In instances in which the backup manager 1302 does differentiate between the partial baseline backup and the incremental backup, the backup manager 1302 can determine which blocks comprise each based on metadata associated with the first backup 1310. For example, the metadata (which might be stored with the first backup 1310 or separately) can specify the particular window size and window counter parameters used to generate the first backup 1310. Further, the metadata can specify the technique used to identify which blocks comprise the partial baseline if the technique is configurable. Once the particular parameters used to identify the blocks that comprise the partial baseline are determined, the backup manager 1302 can perform the same operations used to originally identify the blocks, but instead of going through all blocks being backed up, the backup manager 1302 only performs the operations for the blocks included in the first backup 1310. In other words, the backup manager 1302 can perform the operations depicted at stage C of FIG. 1 but only for blocks 0, 1, 2, 3, 7, and 13.

In some instances, the metadata associated with the first backup 1310 can specify the blocks that comprise the partial baseline backup and the incremental backup. Thus, instead of performing the operations described above, the backup manager 1302 can read the metadata to determine that blocks 0, 1, 2, and 3 comprise the partial baseline backup and that blocks 7 and 13 comprise the incremental backup.

At stage D, the backup manager 1302 writes the data associated with the first backup 1310 to the appropriate blocks of the set of blocks 1304. In this example, the backup manager 1302 writes data to blocks 0, 1, 2, 3, 7, and 13, corresponding to the blocks that comprise the first backup 1310.

Figure 14:
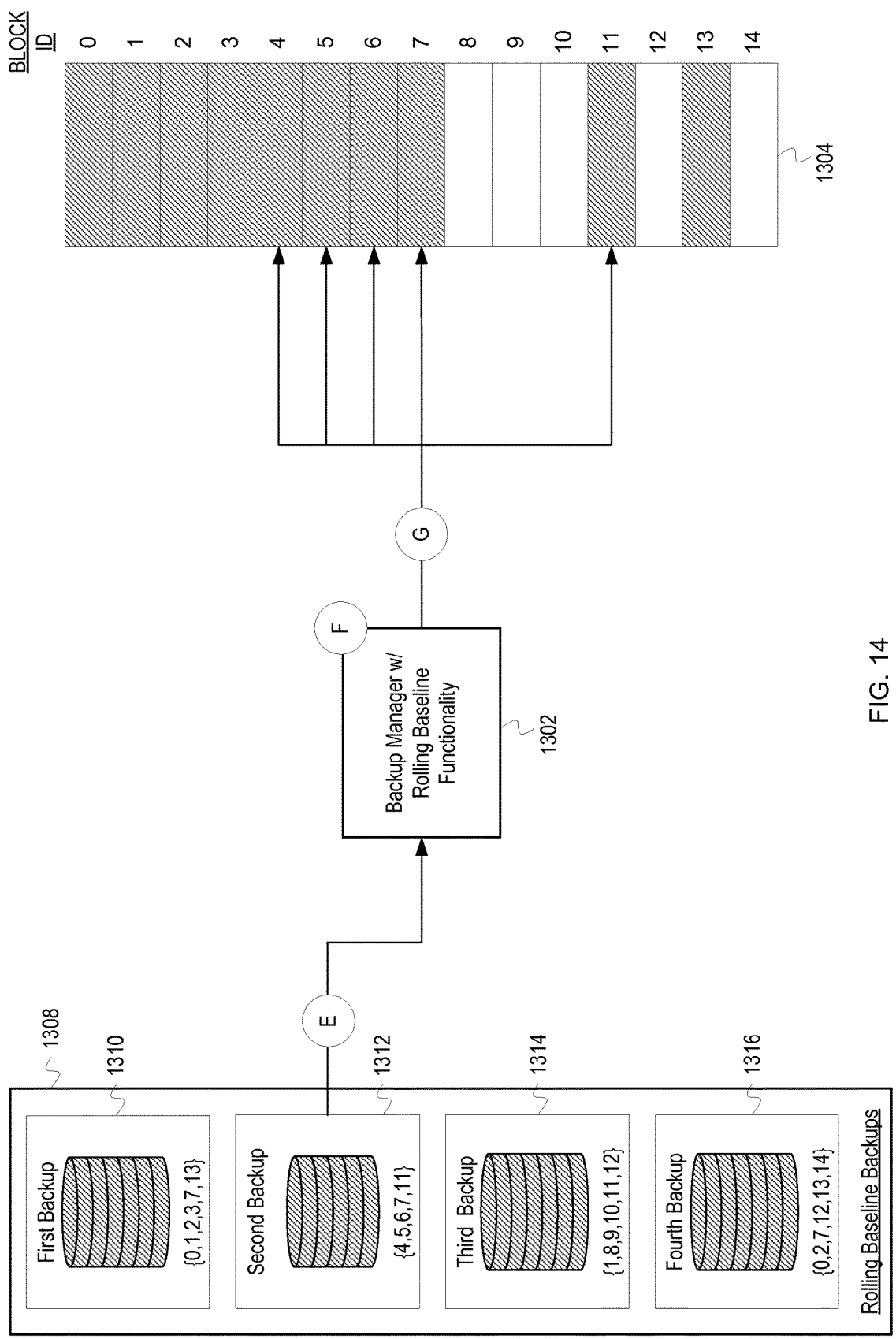
FIG. 14 depicts example operations of a backup manager for restoring part of storage system data using a second partial baseline backup.

FIG. 14 depicts example operations of a backup manager for restoring part of storage system data using a second partial baseline backup. Similar to FIG. 13, FIG. 14 depicts the backup manager 1302 and the set of blocks 1304. FIG. 14 also depicts the set of rolling baseline backups 1308 and backups 1310, 1312, 1314, and 1316.

At stage E, the backup manager 1302 reads the data associated with the second backup 1312, which was identified at stage A of FIG. 13. To read the data associated with the second backup 1312, the backup manager 1302 can perform operations substantially similar to those performed by the backup manager 1302 at stage B of FIG. 13.

At stage F, the backup manager 1302 processes the second backup 1312. The operations performed by the backup manager 1302 to process the second backup 1312 can be substantially similar to those performed by the backup manager 1302 at stage C of FIG. 13. Blocks 4, 5, 6, and 7 comprise the partial baseline backup and block 11 comprises the incremental backup.

At stage G, the backup manager 1302 writes the data associated with the second backup 1312 to the appropriate blocks of the set of blocks 1304. In this example, the backup manager 1302 writes data to blocks 4, 5, 6, 7, and 11, corresponding to the blocks that comprise the second backup 1312. At stage D of FIG. 13, the backup manager wrote data to block 7, which was included in the first backup 1310 as part of the incremental backup. Because block 7 is part of the partial baseline portion of the second backup 1312, the data written at stage D of FIG. 13 corresponding to block 7 is overwritten.

Figure 15:
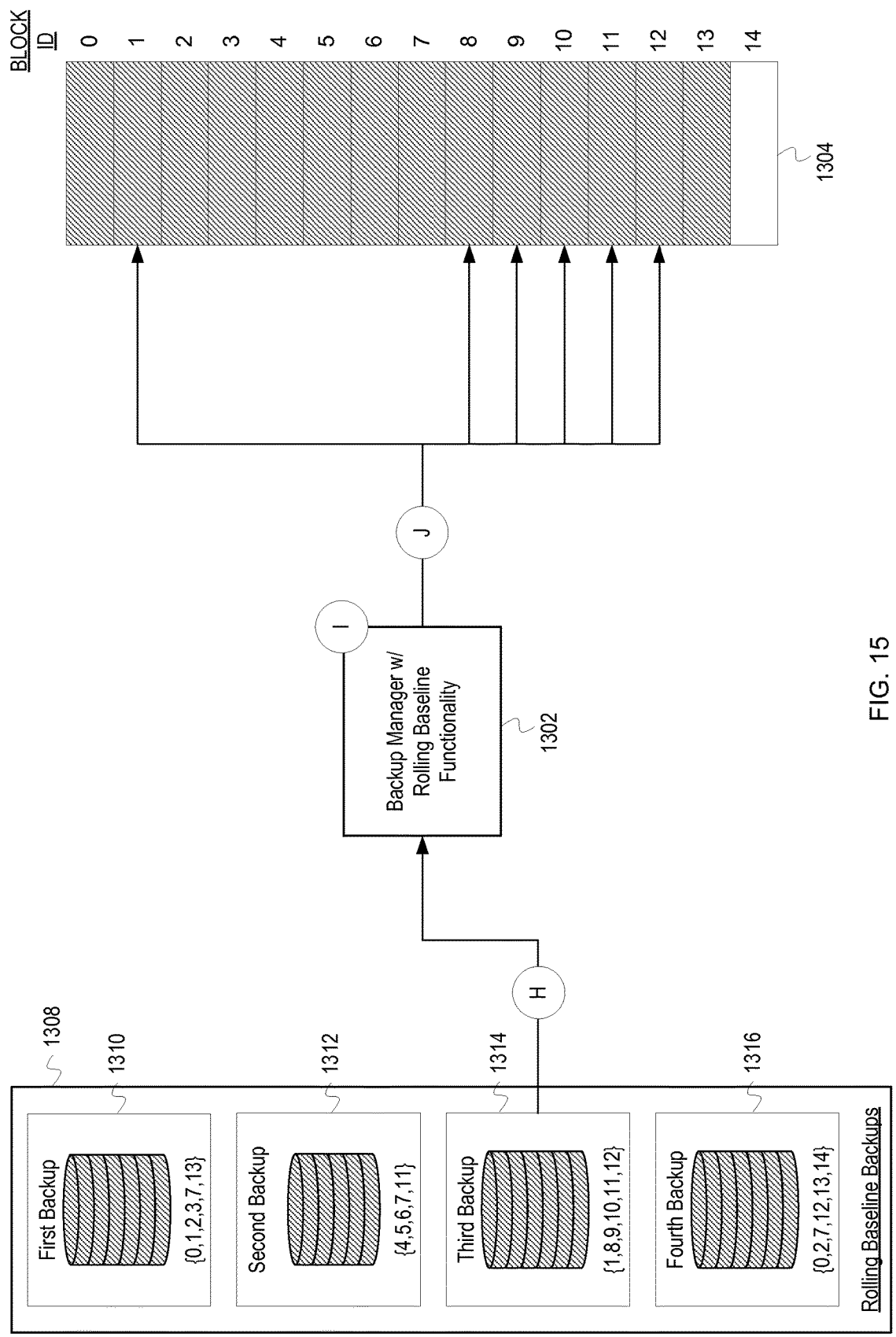
FIG. 15 depicts example operations of a backup manager for restoring part of storage system data using a third partial baseline backup.

FIG. 15 depicts example operations of a backup manager for restoring part of storage system data using a third partial baseline backup. Similar to FIG. 13, FIG. 15 depicts the backup manager 1302 and the set of blocks 1304. FIG. 15 also depicts the set of rolling baseline backups 1308 and backups 1310, 1312, 1314, and 1316.

At stage H, the backup manager 1302 reads the data associated with the third backup 1314, which was identified at stage A of FIG. 13. To read the data associated with the third backup 1314, the backup manager 1302 can perform operations substantially similar to those performed by the backup manager 1302 at stage B of FIG. 13.

At stage I, the backup manager 1302 processes the third backup 1314. The operations performed by the backup manager 1302 to process the third backup 1314 can be substantially similar to those performed by the backup manager 1302 at stage C of FIG. 13. Blocks 8, 9, 10, and 11 comprise the partial baseline backup and blocks 1 and 12 comprise the incremental backup.

At stage J, the backup manager 1302 writes the data associated with the third backup 1314 to the appropriate blocks of the set of blocks 1304. In this example, the backup manager 1302 writes data to blocks 1, 8, 9, 10, 11, and 12, corresponding to the blocks that comprise the third backup 1314. If data was previously written to blocks 1, 8, 9, 10, 11, or 12, the previously written data is overwritten.

Figure 16:
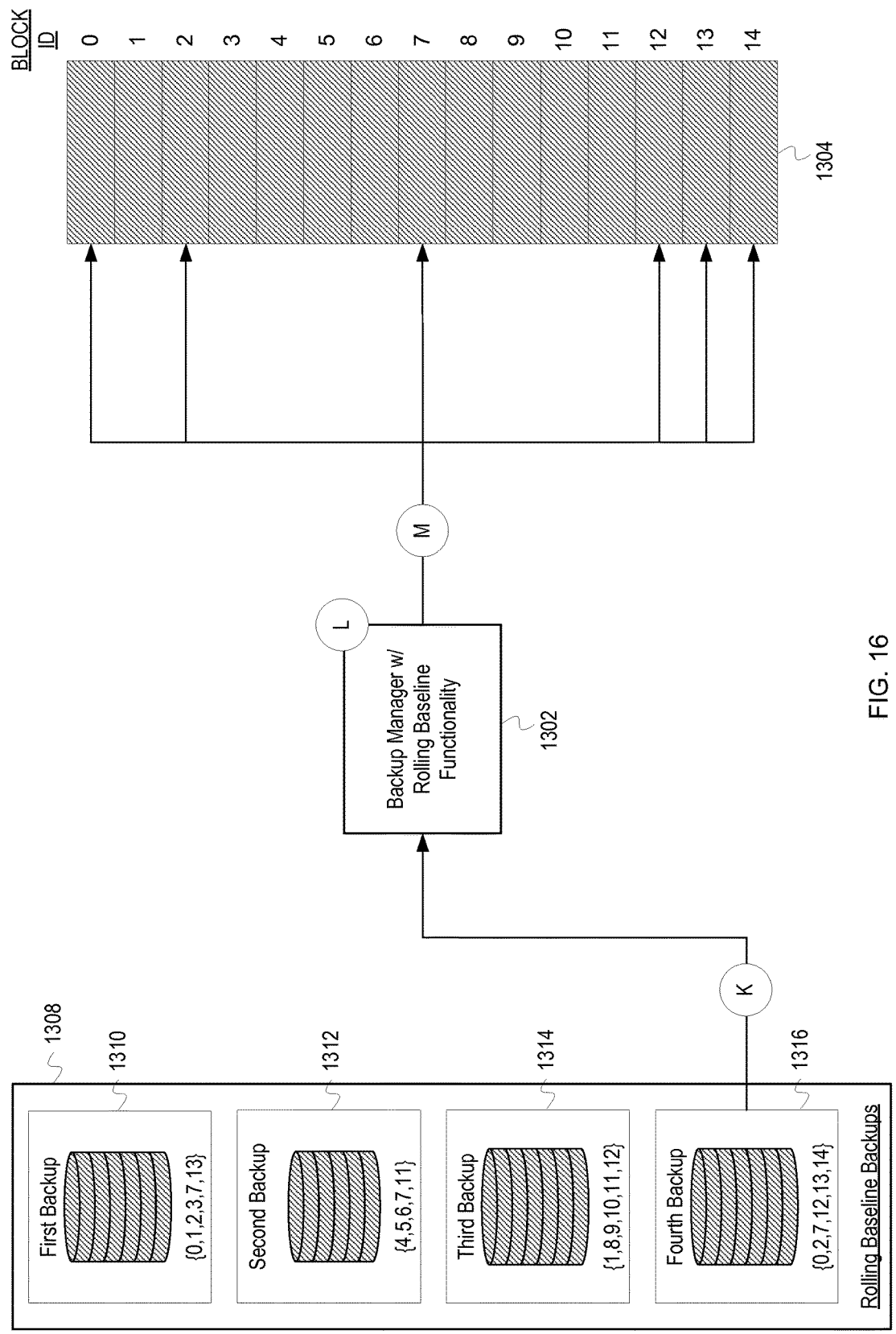
FIG. 16 depicts example operations of a backup manager for restoring part of storage system data using a fourth partial baseline backup.

FIG. 16 depicts example operations of a backup manager for restoring part of storage system data using a fourth partial baseline backup. Similar to FIG. 13, FIG. 16 depicts the backup manager 1302 and the set of blocks 1304. FIG. 16 also depicts the set of rolling baseline backups 1308 and backups 1310, 1312, 1314, and 1316.

At stage K, the backup manager 1302 reads the data associated with the fourth backup 1316, which was identified at stage A of FIG. 13. To read the data associated with the fourth backup 1316, the backup manager 1302 can perform operations substantially similar to those performed by the backup manager 1302 at stage B of FIG. 13.

At stage L, the backup manager 1302 processes the fourth backup 1316. The operations performed by the backup manager 1302 to process the fourth backup 1316 can be substantially similar to those performed by the backup manager 1302 at stage C of FIG. 13. Blocks 12, 13, and 14 comprise the partial baseline backup and blocks 0, 2, and 7 comprise the incremental backup.

At stage M, the backup manager 1302 writes the data associated with the fourth backup 1316 to the appropriate blocks of the set of blocks 1304. In this example, the backup manager 1302 writes data to blocks 0, 2, 7, 12, 13, and 14, corresponding to the blocks that comprise the fourth backup 1316. If data was previously written to blocks 0, 2, 7, 12, 13, or 14, the previously written data is overwritten.

After the backup manager writes the data associated with the fourth backup 1316 to the appropriate blocks, the data has been fully restored. The partial baselines that comprise the individual backups 1310, 1312, 1314, and 1316 combine to create a complete baseline. Thus, if the individual backups 1310, 1312, 1314, and 1316 did not include any incremental backups, they would still be sufficient to fully restore the data.

Figure 17:
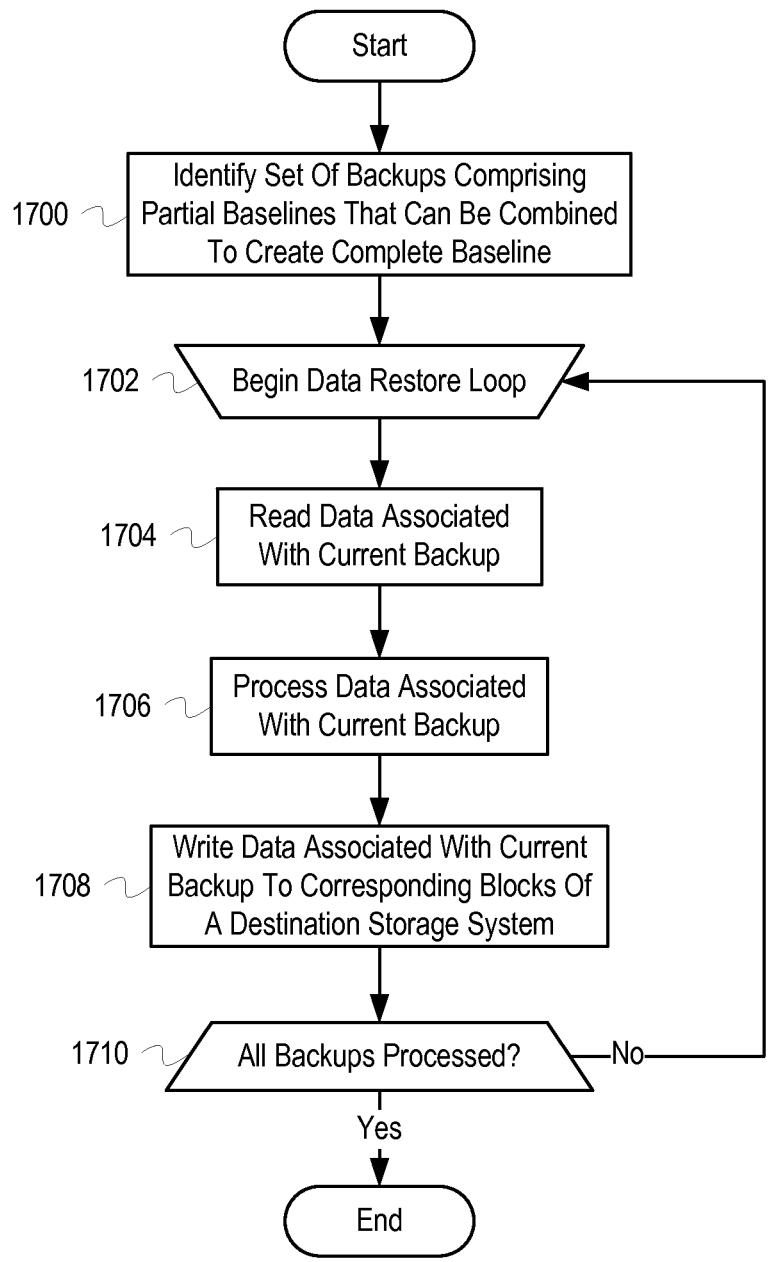
FIG. 17 depicts a flowchart of example operations for restoring data from rolling baseline backups.

FIG. 17 depicts a flowchart of example operations for restoring data from rolling baseline backups. The operations depicted in FIG. 17 can be performed by the backup manager 1302 of FIGS. 13 through 16 or any suitable component.

At block 1700, a backup manager identifies a set backups comprising partial baselines that can be combined to create a complete baseline. In particular, the backup manager determines a set of n backups that were generated immediately preceding a critical date, where n is the window size. Each of the n backups includes a partial baseline and can include incremental backups. The critical date can be determined based on input from a user, a component responsible for maintaining a storage system, etc. After the backup manager determines the set of partial baselines and associated backups that can be combined to create a complete baseline, control then flows to block 1702.

At block 1702, the backup manager begins a data restore loop. During the initial pass through block 1702, the backup manager initializes a current backup variable to refer to a first backup of the set of backups. On subsequent passes through block 1702, the backup manager updates the current backup variable to refer to a backup of the set of backups that has not been iterated over yet. After the backup manager initializes or updates the current backup variable, control then flows to block 1704.

At block 1704, the backup manager reads data associated with the current backup. The particular location that the data is read from can vary. For example, the backup manager might determine that a backup is stored on one of a plurality of media. In some instances, a user might indicate that the backup is stored at a particular location. After the backup manager reads the data associated with the current backup, control then flows to block 1706.

At block 1706, the backup manager processes the data associated with the current backup. The particular operations performed by the backup manager to process the data associated with the current backup can vary. For example, the backup manager might decompress the data if the data was compressed. Further, the backup manager identifies the blocks associated with the data. After the backup manager processes the data associated with the current backup, control then flows to block 1708.

At block 1708, the backup manager writes the data associated with the current backup to corresponding blocks of a destination storage system. In particular, the destination storage system is the storage system to which the data is being restored to. The destination storage system can be the original storage system that the data was backed up from or a different storage system. The backup manager writes the data to the blocks identified at block 1706. After the backup manager writes the data associated with the current backup to the corresponding blocks of the destination storage system, control then flows to block 1710.

At block 1710, the backup manager determines whether all backups have been processed. If all backups have been processed, the process ends. If not all backups have been processed, control then flows back to block 1702.

As with FIGS. 1 through 12, the examples depicted in FIGS. 13 through 17 can be adapted for data unit types other than blocks. For example, if inodes were backed up instead of blocks, the backup manager would write data to the corresponding inodes instead of corresponding blocks.

It should be noted that a data unit can be non-file system-related as well. For example, the techniques above can be applied to databases, database tables, or database tables in rows. For example, each row in a database table can be identified by a unique identifier (whether the row number or a different unique identifier, such as a hash). The same techniques described above can be applied to the rows, thus partitioning the rows similar to blocks, as described above. Similarly, data units can be messages in a message system (e.g., e-mails in an e-mail system). In general, data units can be arbitrary groupings of data that are uniquely identifiable. Thus, data units might be configurable or vary based on user input.

It should also be noted that the techniques described above are not limited to a particular backup system. For example, the techniques described above can be applied to backing up data to secondary clusters (e.g., disk-based backup), remote, virtual storage (e.g., the "cloud"), etc.

As example flowcharts, FIGS. 5-7, 9, 11, 12 and 17 present operations in an example order from which storage systems can deviate (e.g., operations can be performed in a different order than illustrated and/or in parallel; additional or fewer operations can be performed, etc.). For example, while FIG. 7 depicts x as being computed outside of the loop comprising blocks 702-710, x can be computed inside the loop.

Further, loops depicted in the flowcharts may terminate at various points prior to completion of the loops. For example, a node might encounter an error while performing the operations of the loop depicted at blocks 702-710 of FIG. 7 that causes the loop to terminate prior adding the block identifier to the list of blocks that comprise the partial baseline. This can be in addition to other operations depicted that result in early termination of the loop. Similarly, loops identified as "for each" loops might terminate prior to each element being iterated over. In general, some operations not directly pertinent to the disclosures herein have not been depicted, and some of these operations might result in the processes depicted in the flowcharts terminating early.

As will be appreciated by one skilled in the art, aspects of the disclosures herein may be embodied as a system, method or computer program product. Accordingly, aspects of the disclosures herein may take the form of hardware, software (including firmware, resident software, micro-code, etc.) or a combination of software and hardware aspects that may all generally be referred to herein as a "circuit," "module" or "system." Furthermore, aspects of the disclosures herein may take the form of a program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, a system, apparatus, or device that uses electronic, magnetic, optical, electromagnetic, infrared, or semiconductor technology, or a combination thereof. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosures herein may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. Examples of a machine that would execute/interpret/translate program code include a computer, a tablet, a smartphone, a wearable computer, a robot, a biological computing device, etc.

Figure 18:
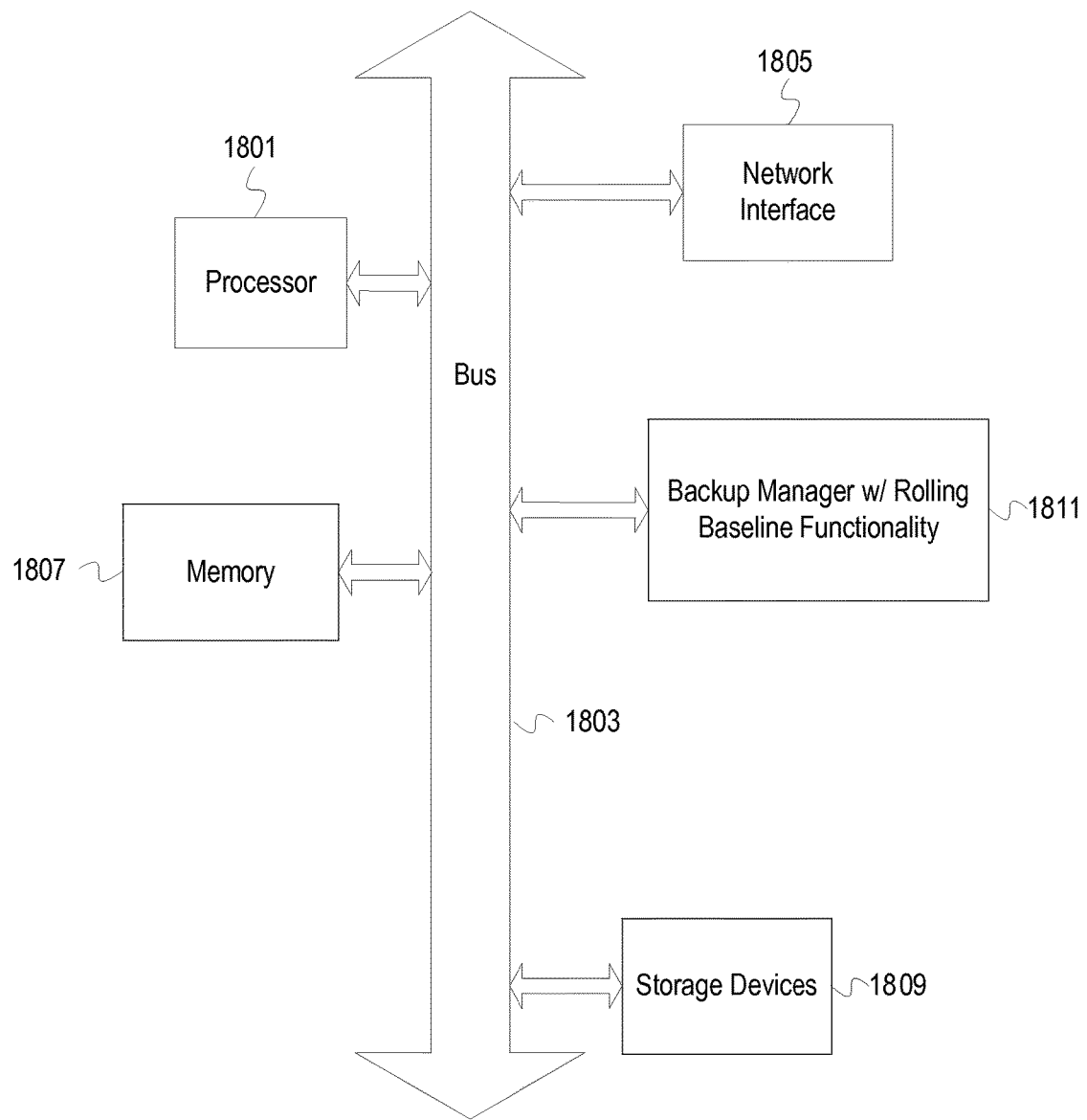
FIG. 18 depicts an example computer system including a backup manager with rolling baseline functionality.

FIG. 18 depicts an example computer system including a backup manager with rolling baseline functionality. A computer system includes a processor 1801 (possibly including multiple processors, multiple cores, multiple nodes, and/or implementing multi-threading, etc.). The computer system includes memory 1807. The memory 1807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above described possible realizations of machine-readable media. The computer system also includes a bus 1803 (e.g., PCI, ISA, PCI-Express, HyperTransport®, InfiniBand®, NuBus, etc.), a network interface 1805 (e.g., an ATM interface, an Ethernet interface, a Frame Relay interface, SONET interface, wireless interface, etc.), and a storage device(s) 1809 (e.g., optical storage, magnetic storage, etc.). The computer system also includes a backup manager 1811. The backup manager 1811 embodies functionality to implement embodiments described above. The backup manager 1811 may include one or more functionalities that facilitate generating rolling baseline backups and restoring data using rolling baseline backups. In particular, the backup manager 1811 may include functionality to identify data units that comprise a particular partial baseline and store data units as a partial baseline backup. The backup manager 1811 may further include functionality to identify a set of backups that comprise partial baselines which can be combined to create a complete baseline and use the backups to restore data. Any one of these functionalities may be partially (or entirely) implemented in hardware and/or on the processor 1801. For example, the functionality may be implemented with an application specific integrated circuit, in logic implemented in the processor 1801, in a co-processor on a peripheral device or card, etc. Further, realizations may include fewer or additional components not illustrated in FIG. 18 (e.g., video cards, audio cards, additional network interfaces, peripheral devices, etc.). The processor 1801, the storage device(s) 1809, and the network interface 1805 are coupled to the bus 1803. Although illustrated as being coupled to the bus 1803, the memory 1807 may be coupled to the processor 1801.

While the examples are described with reference to various aspects and exploitations, it will be understood that these examples are illustrative and that the scope of the disclosures herein is not limited to them. In general, techniques for data backup with rolling baselines as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosures herein. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosures herein.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    selecting a first subset of data units from a plurality of data units of a first storage system to create a first partial baseline for backup of the first storage system, wherein selecting the first subset of data units is based, at least in part, on a counter value and modulo results of identifiers of the plurality of data units with respect to a partial baseline size parameter;
    identifying first changed data of the first storage system, wherein the first changed data comprises data that has changed since a previous backup operation;
    writing first backup data to a second storage system, wherein the first backup data comprises the first partial baseline and the first changed data; and
    at a next backup operation of the first storage system,
        selecting a second subset of data units from the plurality of data units to create a second partial baseline for backup of the first storage system, wherein selecting the second subset of data units is based, at least in part, on an updated counter value and modulo results of identifiers of the plurality of data units with respect to the partial baseline size parameter and wherein the second partial baseline does not include the first partial baseline;

identifying second changed data of the first storage system, wherein the second changed data comprises data that has changed since writing the first backup data; and writing second backup data to the second storage system, wherein the second backup data comprises the second partial baseline and the second changed data.

2. The method of claim 1, wherein selecting the first subset of data units based on the counter value and the modulo results with respect to the partial baseline size parameter comprises determining the first subset of data units as those of the plurality of data units having identifiers corresponding to those of the modulo results equal to the counter value.

3. The method of claim 1, wherein each of the plurality of data units is one of a data block, an inode, or a file, wherein each of the identifiers is one of a block identifier, an inode identifier, or a hash of a file path.

4. The method of claim 1, wherein said selecting the first subset of data units comprises applying a bitmap to the modulo results.

5. The method of claim 1 further comprising incrementing the counter value to generate the updated counter value.

6. The method of claim 1 further comprising:

reading the first backup data from the second storage system;

writing the first backup data to a third storage system; and after writing the first backup data to the third storage system, reading the second backup data from the second storage system; and writing the second backup data to the third storage system.

7. The method of claim 1, further comprising:

assigning a group identifier to the first subset of data units;

identifying a third partial baseline based on the group identifier; and writing third backup data to the second storage system, wherein the third backup data comprises the third partial baseline.

8. A non-transitory machine readable medium having stored thereon instructions comprising program code to:

select a first subset of data units from a plurality of data units of a first storage system to create a first partial baseline for backup of the first storage system, wherein selection of the first subset of data units is based, at least in part, on a counter value and modulo results of identifiers of the plurality of data units with respect to a partial baseline size parameter;

identify first changed data of the first storage system, wherein the first changed data comprises data that has changed since a previous backup operation;

write first backup data to a second storage system, wherein the first backup data comprises the first partial baseline and the first changed data; and at a next backup operation of the first storage system, select a second subset of data units from the plurality of data units to create a second partial baseline for backup of the first storage system, wherein selection of the second subset of data units is based, at least in part, on an updated counter value and modulo results of identifiers of the plurality of data units with respect to the partial baseline size parameter and wherein the second partial baseline does not include the first partial baseline;

identify second changed data of the first storage system, wherein the second changed data comprises data that has changed since writing the first backup data; and write second backup data to the second storage system, wherein the second backup data comprises the second partial baseline and the second changed data.

9. The non-transitory machine readable medium of claim 8, wherein the program code to select the first subset of data units based on the counter value and the modulo results with respect to the partial baseline size parameter comprises program code to determine the first subset of data units as those of the plurality of data units having identifiers corresponding to those of the modulo results equal to the counter value.

10. The non-transitory machine readable medium of claim 8, wherein each of the plurality of data units is one of a data block, an inode, or a file, wherein each of the identifiers is one of a block identifier, an inode identifier, or a hash of a file path.

11. The non-transitory machine readable medium of claim 8, wherein program code to select the first subset of data units comprises program code to apply a bitmap to the modulo results for selection of the first subset of data units.

12. The non-transitory machine readable medium of claim 8, wherein the program code further comprises program code to increment the counter value to generate the updated counter value.

13. The non-transitory machine readable medium of claim 8, wherein the instructions further comprise program code to:

read the first backup data from the second storage system;

write the first backup data to a third storage system; and after writing the first backup data to the third storage system, read the second backup data from the second storage system; and write the second backup data to the third storage system.

14. The non-transitory machine readable medium of claim 8, wherein the instructions further comprise program code to:

assign a group identifier to the first subset of data units;

identify a third partial baseline based on the group identifier; and write third backup data to the second storage system, wherein the third backup data comprises the third partial baseline.

15. An apparatus comprising:

a processor; and a machine readable storage medium having program code stored therein that is executable by the processor to cause the apparatus to, select a first subset of data units from a plurality of data units of a first storage system to create a first partial baseline for backup of the first storage system, wherein selection of the first subset of data units is based, at least in part, on a counter value and modulo results of identifiers of the plurality of data units with respect to a partial baseline size parameter;

identify first changed data of the first storage system, wherein the first changed data comprises data that has changed since a previous backup operation;

write first backup data to a second storage system, wherein the first backup data comprises the first partial baseline and the first changed data; and at a next backup operation of the first storage system, select a second subset of data units from the plurality of data units to create a second partial baseline for backup of the first storage system, wherein selection of the second subset of data units is based, at least in part, on an updated counter value and modulo results of identifiers of the plurality of data units with respect to the partial baseline size parameter and wherein the second partial baseline does not include the first partial baseline;

identify second changed data of the first storage system, wherein the second changed data comprises data that has changed since writing the first backup data; and write second backup data to the second storage system, wherein the second backup data comprises the second partial baseline and the second changed data.

16. The apparatus of claim 15, wherein the program code to select the first subset of data units based on the counter value and the modulo results with respect to the partial baseline size parameter comprises program code to determine the first subset of data units as those of the plurality of data units having identifiers corresponding to those of the modulo results equal to the counter value.

17. The apparatus of claim 15, wherein program code to select the first subset of data units further comprises program code to apply a bitmap to the modulo results for selection of the first subset of data units.

18. The apparatus of claim 15, wherein the program code further comprises program code to increment the counter value to generate the updated counter value.

19. The apparatus of claim 15, wherein the program code further comprises program code to:

read the first backup data from the second storage system;

write the first backup data to a third storage system; and after writing the first backup data to the third storage system, read the second backup data from the second storage system; and write the second backup data to the third storage system.

20. The apparatus of claim 15, wherein the program code further comprises program code to:

assign a group identifier to the first subset of data units;

identify a third partial baseline based on the group identifier; and write third backup data to the second storage system, wherein the third backup data comprises the third partial baseline.

* * * * *